United States Patent
Aiyer et al.

(10) Patent No.: US 7,339,682 B2
(45) Date of Patent: Mar. 4, 2008

(54) HETERODYNE REFLECTOMETER FOR FILM THICKNESS MONITORING AND METHOD FOR IMPLEMENTING

(75) Inventors: Arun Ananth Aiyer, Fremont, CA (US); Mark A. Meloni, Flower Mound, TX (US); Kenneth C. Harvey, Dallas, TX (US); Andrew Weeks Kueny, Dallas, TX (US)

(73) Assignee: Verity Instruments, Inc., Carrollton, TX (US)

( * ) Notice: Subject to any disclaimer, the term of this patent is extended or adjusted under 35 U.S.C. 154(b) by 153 days.

(21) Appl. No.: 11/066,933

(22) Filed: Feb. 25, 2005

(65) Prior Publication Data

US 2006/0192973 A1    Aug. 31, 2006

(51) Int. Cl.
    *G01B 9/02*    (2006.01)
(52) U.S. Cl. .................. 356/504; 356/485; 356/492
(58) Field of Classification Search ................ 356/484, 356/485, 491, 492, 503, 504, 505, 493; 250/559.27
    See application file for complete search history.

(56) References Cited

U.S. PATENT DOCUMENTS

| | | | |
|---|---|---|---|
| 4,688,940 A | 8/1987 | Sommargren | |
| 5,450,205 A | 9/1995 | Swain et al. | |
| 5,548,401 A | 8/1996 | Ozaki | |
| 5,600,441 A * | 2/1997 | de Groot et al. | ............ 356/492 |
| 5,657,124 A | 8/1997 | Zhang et al. | |
| 6,172,752 B1 | 1/2001 | Haruna | |

(Continued)

OTHER PUBLICATIONS

Hongzhi Zhao, et al., in "A Practical Heterodyne Surface Interferometer with Automatic Focusing," SPIE Proceedings, vol. 4231, 2000, p. 301.

*Primary Examiner*—Hwa (Andrew) Lee
(74) *Attorney, Agent, or Firm*—Rudolph J. Buchel, Jr.

(57) ABSTRACT

The present invention is directed to a heterodyne reflectometer system and method for obtaining highly accurate phase shift information from heterodyned optical signals, from which extremely accurate film depths can be calculated. A linearly polarized light comprised of two linearly polarized components that are orthogonal to each other, with split optical frequencies, is directed toward a film causing one of the optical polarization components to lag behind the other due to an increase in the optical path in the film for that component. A pair of detectors receives the beam reflected from the film layer and produces a measurement signal, and the beam prior to incidence on the film layer and generates a reference signal, respectively. The measurement signal and reference signal are analyzed by a phase detector for phase shift. The detected phase shift is then fed into a thickness calculator for film thickness results. A grating interferometer may be included with the heterodyne reflectometer system with a grating, which diffracts the reflected beam into zeroth- and first-order bands, which are then detected by separate detectors. A detector receives the zeroth-order beam and generates another measurement signal. Another detector receives the first-order beam and generates a grating signal. The measurement signal from the grating and reference signal may be analyzed by a phase detector for phase shift, which is related to the thickness of the film. Conversely, either measurement signal may be analyzed with the grating signal by a phase detector for detecting a grating phase shift. The refractive index for the film may be calculated from grating phase shift and the heterodyne phase shift. The updated refractive index is then used for calculating thickness.

62 Claims, 25 Drawing Sheets

U.S. PATENT DOCUMENTS

| | | |
|---|---|---|
| 6,215,556 B1 | 4/2001 | Zhang et al. |
| 6,261,152 B1 | 7/2001 | Aiyer |
| 6,710,881 B1 * | 3/2004 | Ngoi et al. ................. 356/487 |
| 6,753,968 B2 * | 6/2004 | Hill ............................ 356/491 |
| 6,768,543 B1 * | 7/2004 | Aiyer ...................... 356/237.4 |

* cited by examiner

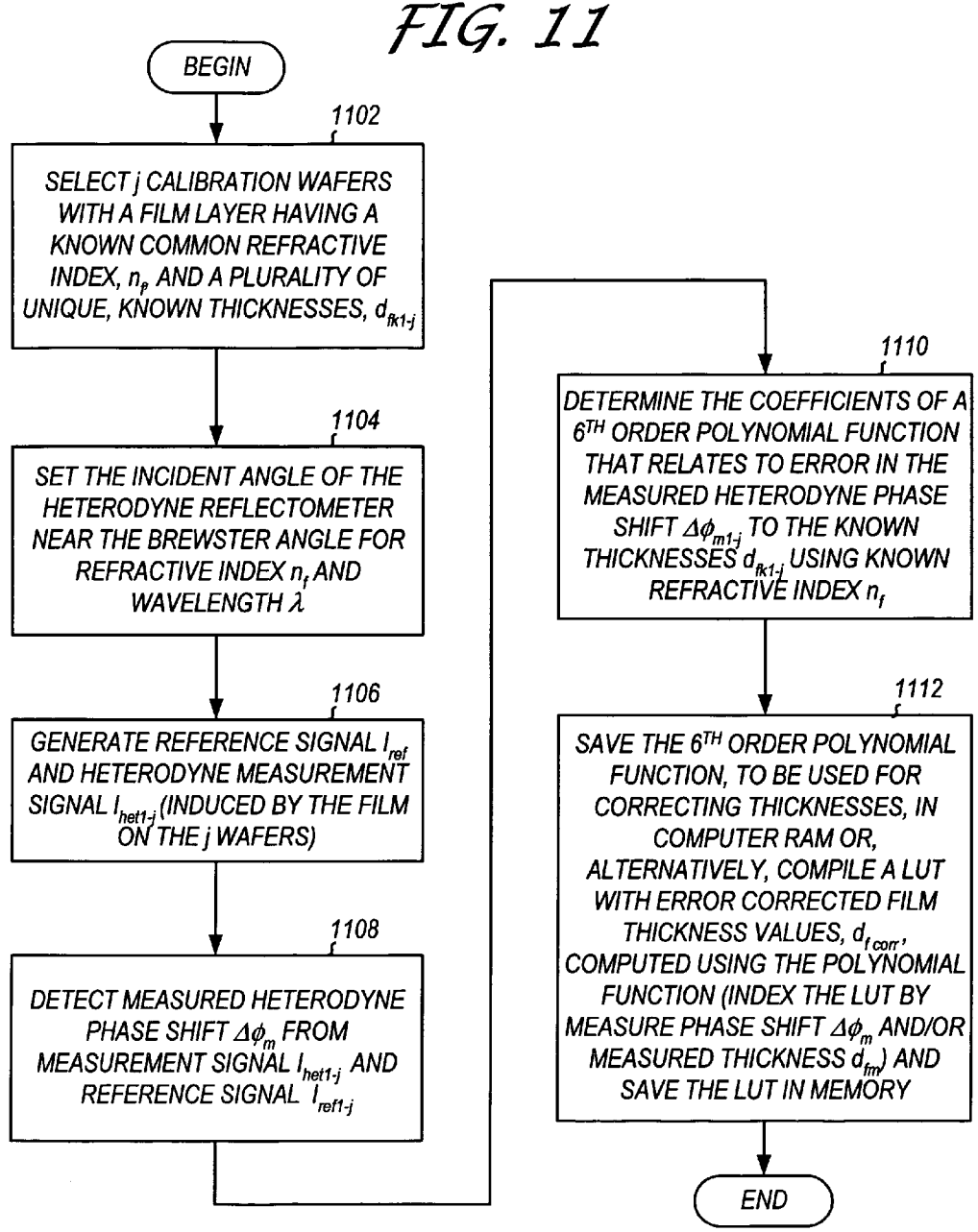

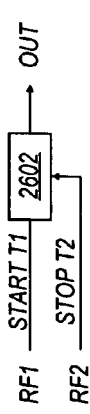
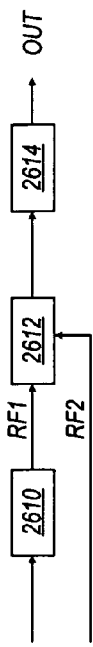
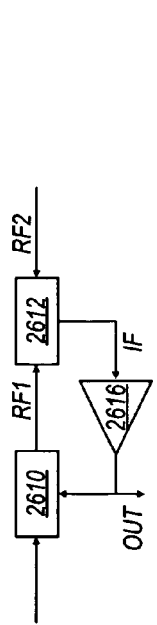
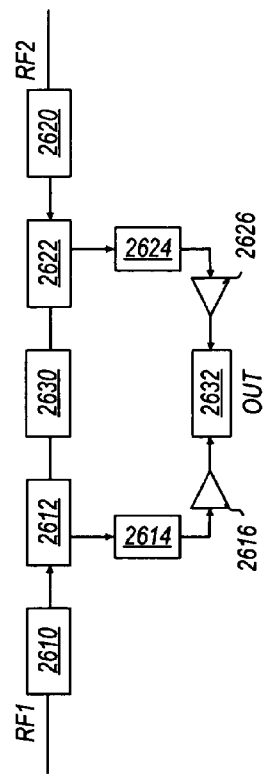
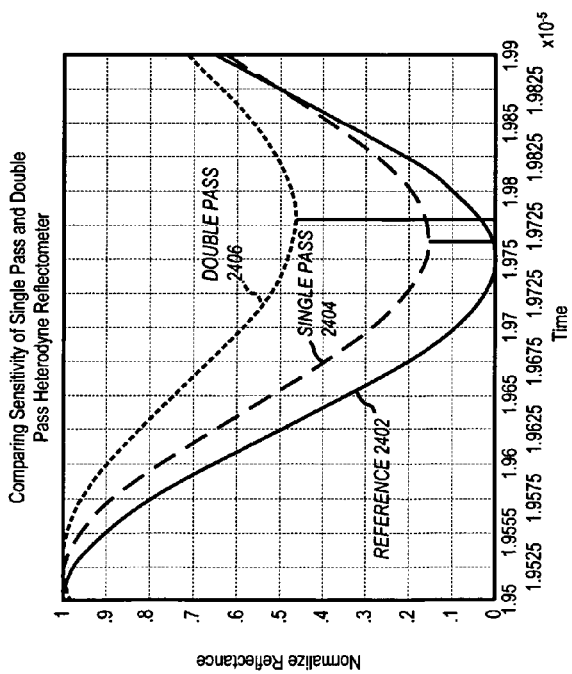

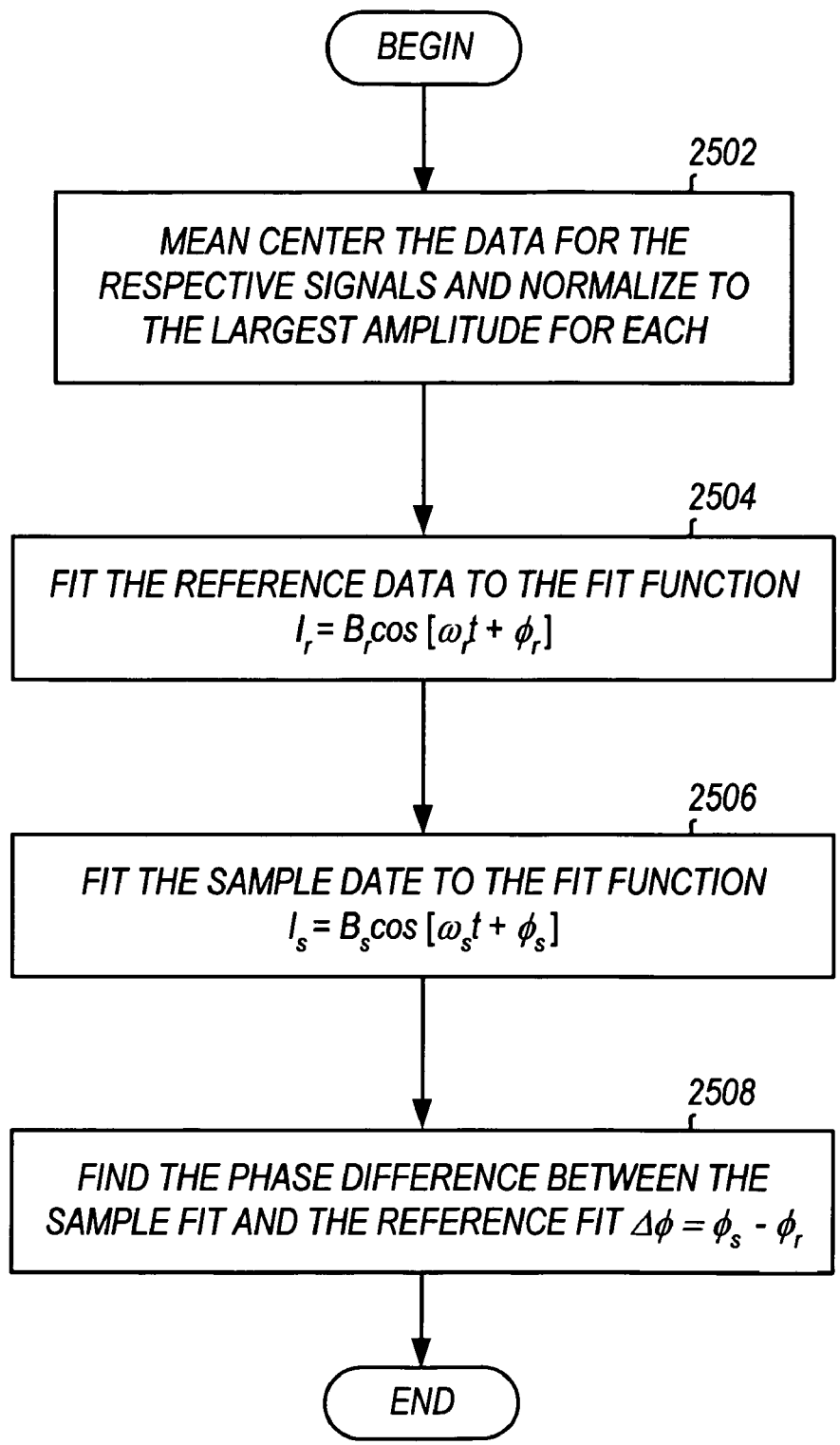

HETERODYNE REFLECTOMETER FOR FILM THICKNESS MONITORING AND METHOD FOR IMPLEMENTING

BACKGROUND OF THE INVENTION

1. Field of the Invention

The present invention relates to reflectometry. More particularly, the present invention relates to a reflectometer system and method for obtaining thickness information by measuring phase shift in reflected split frequency signals via heterodyne interferometry. Furthermore, the present invention relates to a method and system for using the heterodyned signals from a heterodyne reflectometer for measuring the thicknesses of thin and ultra thin films formed over substrates. Still more particularly, the present invention relates to a heterodyne reflectometer for in situ monitoring of film thickness. Additionally, the present invention relates to grating interferometry and measuring phase shift in heterodyne signals resulting from reflection in a film and from diffraction in a grating. Even still more particularly, the present invention relates to a combination heterodyne reflectometer and grating interferometer for obtaining thickness information for a film from measuring phase shift in reflected heterodyned signals and obtaining a refractive index for the film from measuring grating induced phase shift in diffracted heterodyned grating signals, and dynamically updating the refractive index in a thickness calculation.

2. Description of Related Art

Semiconductors such as chips, microchips, or integrated circuits (ICs) are composed of a myriad of tiny transistors, aluminum or copper lines and electric switches, which manipulate the flow of electrical current. Semiconductor wafers are transformed into ICs by performing various processes on the wafer substrate and/or subsequently formed layers above the substrate; these include imaging, deposition and etching. A commonly held axiom within the semiconductor industry states that the density of transistors in an integrated circuit is expected to double every eighteen months. Thus, the implementation of new techniques for fabricating ever-smaller semiconductor structures is necessary to meet this goal. Due to the increasing demand for ultra precise tolerances in chip fabrication, the physical characteristics of the subsequent layers must be very carefully controlled during processing to achieve satisfactory results for most applications. One method for monitoring the depth and/or thickness of a layer or stack of layers is interferometry. Broadly defined, interferometry relates to the measurement of the interaction of waves, in this case, optical waves.

An interferometer works on the principle that two coherent waves that coincide with the same phase will enhance each other while two waves that have opposite phases will cancel each other out.

One prior art monitoring system utilizes interferometry for measuring variations in surface profiles, from which feature height information can be inferred. Hongzhi Zhao, et al., in "A Practical Heterodyne Surface Interferometer with Automatic Focusing," SPIE Proceedings, Vol. 4231, 2000, p. 301, which is incorporated herein by reference in its entirety, discloses an interferometer for detecting a phase difference between reference heterodyne signal, and a measurement signal. Height information related to the sharp illumination point on the surface can be inferred from the measurement. Although the reference and measurement signals are generated by beams that are propagated over different paths, this is a common path interferometer. This approach is sometimes referred to as the common-axis approach or the normal-axis approach because the incident and reflected beams occupy a common path or axis to a target location, which is normal to the surface being examined.

One shortcoming of the common-path heterodyne interferometers known in the prior art is that the height information is calculated from an average height of the large illumination area of the reference signal. Thus, the accuracy of the results is adversely affected by surface roughness. Another limitation of the prior art common axis method is that it does not measure or calculate an actual thickness parameter for a film layer.

Other attempts in monitoring film thicknesses achieve heterodyning by frequency modulating the light source. U.S. Pat. No. 5,657,124 to Zhang, entitled "Method of Measuring the Thickness of a Transparent Material," and U.S. Pat. No. 6,215,556 to Zhang, et al., entitled "Process and Device for Measuring the Thickness of a Transparent Material Using a Modulated Frequency Light Source," disclose such devices, and are incorporated herein by reference in their entireties. With regard to these devices, a polarized light beam having a modulated frequency is directed to the target surface and heterodyne interference signals are detected from two rays, one reflected off the top surface of a target and a second from a bottom surface of a target. A thickness is determined from the number of beats per modulation period by comparing the heterodyned interference signals with the linearly modulated intensity of the light source. The principle drawback of these types of devices is that since the heterodyning is achieved by frequency modulating the source and thinnest film measurable is limited by its bandwidth.

Other heterodyne interferometers obtained a heterodyned signal from two separate beams, a first beam at a first frequency and polarization and a second beam at a second frequency and polarization. U.S. Pat. No. 6,172,752 to Haruna, et al., entitled "Method and Apparatus for Simultaneously Interferometrically Measuring Optical Characteristics in a Noncontact Manner," and U.S. Pat. No. 6,261,152 to Ayer, entitled "Heterodyne Thickness Monitoring System," which are incorporated herein by reference in their entireties, disclose this type of interferometer.

FIG. 1 is a diagram of a heterodyne thickness monitoring apparatus in which a pair of split frequency, orthogonally polarized beams are propagated in separate optical paths prior to being mixed and heterodyned, as is generally known in the prior art for use with a Chemical Mechanical Polishing (CMP) apparatus. Accordingly, heterodyne thickness monitoring system 100 generally comprises a CMP apparatus, a wafer 110 and a measurement optical assembly. Wafer 110 includes substrate 112 and film 114.

The measurement optical assembly generally comprises various components for detecting and measuring a Doppler shift in the optical frequency of the reflected beam, including laser source 140, beam splitter (BS) 144, polarization beam splitter (PBS) 146, beam quarter-wave plate 148, beam reflector 152, beam quarter-wave plate 150, mixing polarizer 143, photodetector 147, mixing polarizer 145, photodetector 149, and signal-processing assembly 140 electrically connected to the outputs of photodetectors 147 and 149.

In operation, laser diode 140 emits a beam having first linear polarized light component 102 at a first wavelength and second linear polarized component 103 at a second wavelength, but orthogonally polarized to the first polarization component. The first and second polarization components 102 and 103 propagate collinearly to BS 144 where a portion of both components are reflected to mixing polarizer 145 as beams 114 and 115 and then to detector 149 as beams 116 and 117, where signal I₂ is produced.

The transmitted portions of polarization components 102 and 103 propagate to PBS 146 as beams 104 and 105. At PBS 146 component 104 follows a first transmission path as beam 120 and passes through reference quarter-wave plate 148 to reflector 152 and is reflected back through quarter-wave plate 148 as beam 122 (orthogonally polarized to beam 120), where it reflects at PBS 146 to mixing polarizer 143 and on to detector 147 as beam 124.

The second polarization component, from component 105, follows a separate transmission path, from the first path, as beam 120 and is orthogonally oriented to first polarization component 104 and, therefore, reflects off PBS 146, passes through quarter-wave plate 150 as beam 109 and propagates to optically transparent rotatable carrier 115. Beam 109 experiences partial reflection at the back surface rotatable carrier 115, the interface between substrate 112 and the top surface of film 114, thereby producing partially reflected beams 111S, 111T and 111B, respectively. Each of reflected beams 109S, 109T and 109B propagate back through quarter-wave plate 150, are transmitted through PBS 146 as beams 113S, 113T and 113B and propagate collinearly with beam 122 to mixing polarizer 145 as beams 124, 115S, 115T and 115B and then detected at photodetector 147 as signal I₂. Importantly, I₂ is produced from both beam 107, which oscillates at one optical frequency and interacts the film, and beam 120, which oscillates at another optical frequency and that propagates in a second optical path that does not interact with the film. Signals I₁ and I₂ are compared for finding a thickness measurement.

When the measurement beam undergoes an optical path length change, the beat signal will experience corresponding phase shift as shown in the simulated result depicted in the diagram of FIG. 2. There, the phase of beat signal I₂ (plot 103) is depicted as being shifted by Δφ from beat signal I₁ (plot 105) due to the change in the optical path length of partially reflected beam 111T from the top surface of film 114, when the surface is eroded by polishing.

As can be seen, in the measurement path beam 111B is transmitted through the wafer and is reflected from the front wafer surface. As the optical beam path through the wafer is shortened, the reflected optical frequency of beam 111B undergoes a Doppler shift. Thus, one optical frequency (beams 111S, 111B and 111T) interacts with the target while the second optical frequency (beam 122) does not. However, separating the reference beam and measurement beam in such a manner has the disadvantage of degrading the S/N ratio of the heterodyne interferometer and reducing measurement sensitivity.

Generally, the resolution of heterodyne interferometers known in the prior art is limited to approximately 6 Å, thus prior art heterodyne interferometers lack the resolution necessary for accurately measuring thin films or for monitoring small changes in thickness during processing.

SUMMARY OF THE INVENTION

The present invention is directed to a heterodyne reflectometer system and method for obtaining highly accurate phase shift information from heterodyned optical signals, from which accurate thicknesses can be calculated. The heterodyne reflectometer is generally comprised of an optical light source with split optical frequencies, a pair of optical mixers to generate the optical beat signal, a pair of optical detectors for detecting and converting the optical beat signal to electrical heterodyne beat signals, and a phase shift detector for detecting a phase shift between the two electrical signals.

The source generates a linearly polarized light comprised of two linearly polarized components that are orthogonal to each other, with split optical frequencies, i.e., s- and p-polarized beam components at split angular frequencies of ω and ω+Δω, respectively. The linearly polarized optical beam with two frequencies is directed toward the film and interacts with the same causing one of the optical polarization components to lag behind the other due to an increase in the optical path in the film for that component. A mixing polarizer mixes the reflected polarization components. One detector receives the beam reflected from the film layer and produces a measurement signal. The second detector receives the beam prior to incidence on the film layer and generates a reference signal. The reflected beam components have a phase shift with respect to the reference signal, due to the interaction with the film.

The reflected beam may be optimized for film thickness measurement by setting the system incidence angle near the Brewster's angle for the film, which is controlled by its refractive index at the source wavelength. The greatest phase shift between reference signal and measurement signal exists where the incidence of the beam is set to Brewster's angle. The measurement signal and reference signal are analyzed by a phase detector for phase shift. The amount of the phase shift between the two is related to the thickness of the film. The detected phase shift is then fed into a thickness calculator for film thickness results. Typically, the thickness results are more accurate at lower thicknesses and less accurate at higher thicknesses.

The accuracy of the thickness results can be increased substantially by canceling the error in the measurement signal, i.e., the measured heterodyne phase shift differs from the expected phase shift, and thus contains an error. An error correction algorithm is constructed by measuring the heterodyne phase shifts for test films having a known common refractive index and known film thicknesses. The measured phase shifts for the calibration films are compared to the expected phase shifts derived for comparable thicknesses, and then the error correction formulated from the measured and expected phase shifts. The measured heterodyne phase shift can then be corrected using the error correction.

This present invention is also directed to a combination heterodyne reflectometer and grating interferometer system and method for simultaneously obtaining corrected heterodyned phase shift information and corrected grating phase shift information, from which extremely accurate film thicknesses are calculated and which the refractive index of the film is dynamically updated in the thickness computation. This may be accomplished by including a grating interferometer with the heterodyne reflectometer system described above.

A grating with pitch "p" diffracts the reflected beam into zeroth- and first-order bands, which are then detected by separate detectors. A detector receives the zeroth-order beam and generates another measurement signal. Another detector receives the first-order beam and generates a grating signal. As in the above, the measurement signal from the grating and the reference signal may be analyzed by a phase detector for phase shift, which is related to the thickness of the film. Conversely, either measurement signal may be analyzed with the grating signal by a phase detector for detecting a grating induced phase shift. The refractive index for the film may be calculated from grating phase shift and the heterodyne phase shift. However, the grating signal also contains an error that should be corrected. A grating error correction algorithm is constructed for correcting the measured grating phase shift to an expected grating phase shift for the thickness. By measuring the grating phase shifts for test films with known thicknesses and comparing those measurements to the expected grating phase shifts for the thicknesses, a grating phase shift error correction can be formulated between the measured and expected phase shifts. The measured grating phase shift can then be corrected.

An updated refractive index can be produced from the corrected heterodyne phase shift and corrected grating phase shift, which is used for dynamically updating the thickness correction in near real time. Thus, accurate film thickness results are obtainable for ultra thin film, even in situations where the film refractive index drifts during processing.

Additionally, the present invention can operate in a double-pass mode by redirecting the reflected beam from a first pass back to the surface of the film at the incidence angle.

BRIEF DESCRIPTION OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIG. 11 is a flowchart depicting a process for determining a phase shift correction algorithm for heterodyne phase shift measurements in accordance with an exemplary embodiment of the present invention;

FIG. 24 is a diagram showing the relationship between a reference phase and the phases obtained using the single-pass approach and the double-pass approach; and FIG. 25 is a flowchart depicting a process for determining a phase difference between two signals in accordance with an exemplary embodiment of the present invention;

FIGS. 26A-26D are diagrams depicting various means for detecting $\Delta\phi$ in accordance with exemplary embodiments of the present invention;

Other features of the present invention will be apparent from the accompanying drawings and from the following detailed description.

DETAILED DESCRIPTION OF THE INVENTION

This present invention is useful in monitoring deposition of ultra thin films that are part of semiconductor fabrication. Hence, it can be integrated with deposition tools and diffusion furnaces. Furthermore, the present invention provides an uncomplicated and effective means for extending the use of visible light reflectometry to measure thin-films in the sub 10 Å to 2000 Å film thickness range. Using the present invention, it is possible to obtain superior results by using a monochromatic source with large mean time between failure (MTBF) and a very simple detection scheme. Typically, extension of prior art spectral reflectometers into this thickness region require complex deep ultraviolet (DUV) light sources and reflective or catadioptric optics. Additionally, and in contrast with prior art reflectometers, the present invention does not require a priori knowledge of under layers to determine thickness of several Angstroms thick top layer film. Furthermore, the cost of ownership of a sensor based on this invention is much lower than that of a typical prior art DUV spectral reflectometer and the methodology of the present invention requires less pre-measurement processing. The application of the present invention and the techniques disclosed below enable processors to accurately monitor the thickness of an area or a point target on ultra thin films without error induced by surface profiles or wide area measurements.

In a Michelson heterodyne interferometer, the interfering reference beam and measurement beam have slight optical frequency difference, typically ~KHz to MHz. The interference between the two is represented by the equation:

$$I = A + B \cos(\Delta\omega t + \phi) \quad (1)$$

A is a direct current component;
B is the signal component that represents fringe visibility;
$\phi$ is the phase difference between reference beam and measurement beam; and
$\Delta\omega$ is the angular frequency difference between the two signals. The interference between the two can be observed as a beat signal with an angular frequency equal to the difference angular frequency, $\Delta\omega$.

Figure 2:
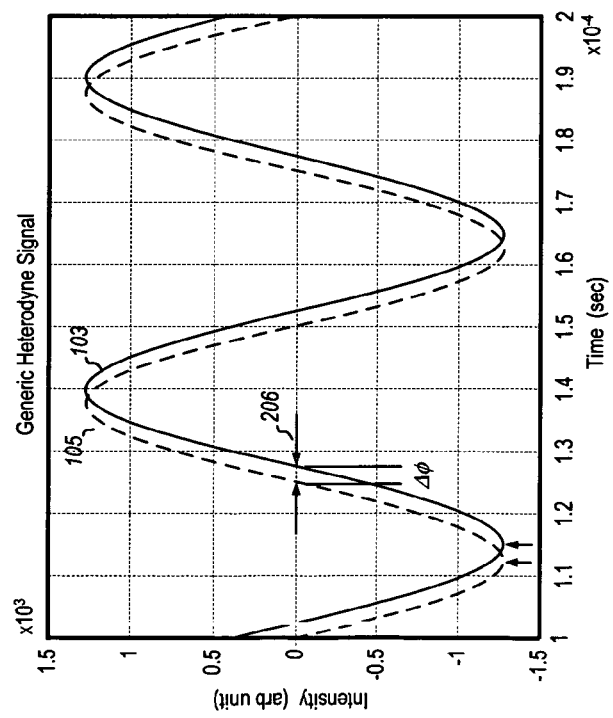
FIG. 2 is a diagram of the measurement signal and the reference signal of a prior art generic heterodyne interferometer showing a phase shift to the measurement signal induced by the optical path length change.

When the measurement beam undergoes an optical path length change ($\Delta d$), the beat signal will experience corresponding phase shift $\Delta\phi = (4\pi \times \Delta d)/\lambda$ as shown in the simulated result depicted in the diagram of FIG. 2. There, the phase of measurement beat signal 103 is depicted as being shifted by $\Delta\phi$ from a reference beat signal 105 due to the change in the optical path length of the measurement beam.

The invention presented below provides an uncomplicated heterodyne reflectometry approach to thin film measurements in response to the shortcoming of the prior art. The sensitivity provided by this approach is such that angstrom type film thickness measurements can accurately be determined. Furthermore, since simple sine waves are employed, phase shift measurements can be realized in real time. These and other features of the present invention will be more thoroughly understood with the description of the heterodyne reflectometer for measuring thicknesses of ultra thin films illustrated in FIG. 3A.

Figure 3A:
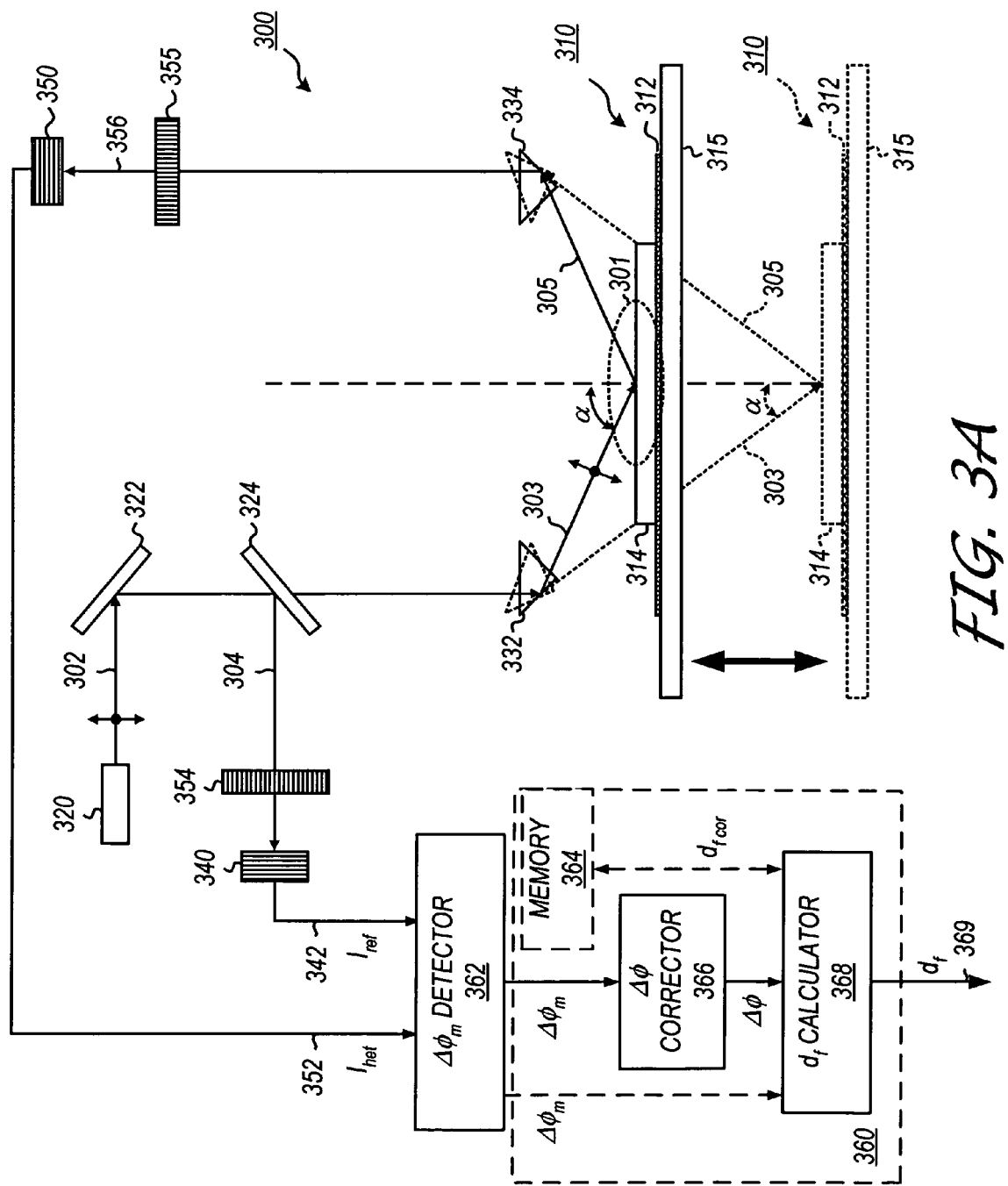
FIG. 3A is a diagram of a heterodyne reflectometer for measuring thin film thicknesses in accordance with an exemplary embodiment of the present invention.

FIG. 3A is a diagram of a heterodyne reflectometer for measuring thin film thicknesses in accordance with an exemplary embodiment of the present invention. As necessary for describing certain aspects of the present invention, area 301 will be discussed as an enlarged view of the beam-to-film interactions in FIG. 3B. Heterodyne reflectometer 300 generally comprises optics for directed incident beam 303 incident on film 314 and substrate 312 at incidence angle $\alpha$.

Beam 303 comprises two linearly polarized components that are orthogonal to each other, with split optical frequencies, i.e., s- and p-polarized beam components at split frequencies of $\omega$ and $\omega + \Delta\omega$, respectively. As used herein, $\Delta\omega$ is approximately 20 MHz, but is merely exemplary and other frequency splits may be used without departing from the scope of the present invention. Light source 320 for generating this beam may be, for example, a Zeeman split He—Ne laser. Alternatively, the beam from a single mode laser source can be split into two separate beams with one or both of the separate beams being frequency shifted to a predetermined frequency using, for example, an acousto-optic modulator. The split-frequency beams can then be recombined prior to incidence with film 314. The light beam is directed into the plane of incidence, and toward film 314, using any suitable optical component for redirecting the path of the aforementioned light beam. As depicted in the figure, a pair of triangular prisms (incident prism 332 and reflection prism 334) direct incident beam 303 incident to film 314 and receive reflected beam 305 from film 314, but optionally may be any suitable optical component for directing the light path while retaining the beam's polarization. For example, light source 320 may be directed in the plane of incidence (at incidence angle $\alpha$ from normal), using a mirror or other reflecting optical component, or, alternatively, coupled into polarization preserving fibers which are then positioned to launch the beam at the predetermined incidence angle.

Notice however, in stark contrast with the prior art, the paths of both optical frequencies interact with the film along a single path, i.e., the s-polarization component and the p-polarization component of the measurement beam are substantially collinear beams and approximately coaxial. Furthermore, the illuminated areas on film 314 from s-polarization and p-polarization components are approximately coextensive at the target location.

A primary function of a heterodyne reflectometer of the present invention is to determine the actual phase shift, $\Delta\phi$, from a measured phase shift, $\Delta\phi_m$. Measured phase shift $\Delta\phi_m$ is the phase difference between the phase of reference signal $I_{ref}$ and the phase of measurement signal $I_{het}$, i.e., the beat of a signal obtained from a non-reflected path (the reference signal) and the beat signal obtained from a reflected path. The true (or actual) phase shift $\Delta\phi$ is necessary for determining an error-free and accurate thickness of a film layer, $d_f$. Therefore, finding measured phase shift $\Delta\phi_m$ necessitates employing two signal detectors, one for detecting/generating reference signal $I_{ref}$ and a second for detecting/generating the measurement signal $I_{het}$.

Signal detector 340 senses the split beam (reference beam) 304 from mixing polarizer 354, which mixes the s- and p-polarization components of beam 304, prior to reflecting off of film 314, and produces reference signal $I_{ref}$ 342, which is indicative of the phase of beam 304, phase $\phi$. Detector 340 may be, for example, a PIN (Positive-Intrinsic-Negative) detector, or any photo detector that responds to the beat frequency, and produces reference signal $I_{ref}$ with a beat frequency of $|\omega - (\omega + \Delta\omega)|$. Reference signal $I_{ref}$ 342 is transmitted to $\Delta\phi_m$ measured phase shift detector 362, where it is used as the reference phase for determining measured phase shift $\Delta\phi_m$ induced by film 314.

Figure 18:
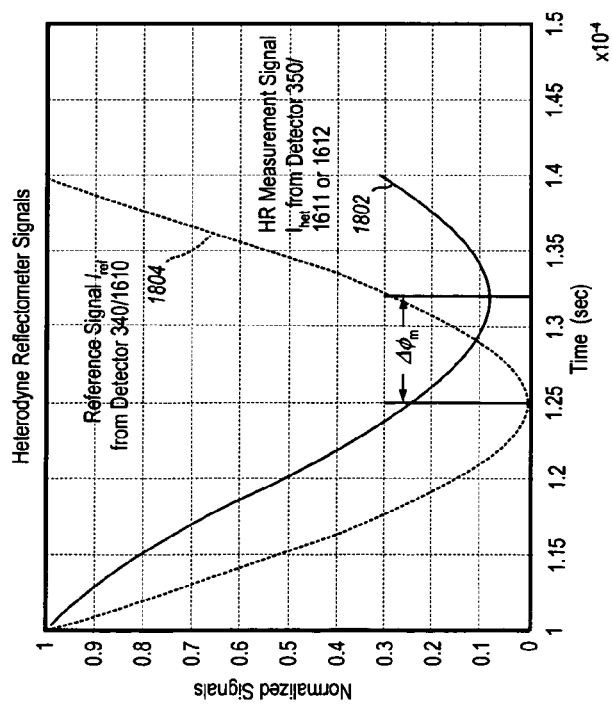
FIG. 18 is a diagram showing the relationship between the measurement signal $I_{het}$ and reference signals $I_{ref}$ with the heterodyne phase shift $\Delta\phi_m$.

Signal detector 350, on the other hand, senses reflected beam 356 from mixing polarizer 355, which mixes the s- and p-polarization components of beam 305, propagated from prism 334, and after interacting with film 314. Signal detector 350 produces measurement signal $I_{het}$, 352, which is indicative of the phase of beam 356, phase $\phi+\Delta\phi$, and is phase shifted from the phase of reference signal $I_{ref}$ by $\Delta\phi$. Detector 350 may be, as an example, a PIN detector, which monitors the reflected optical beam 356 and produces heterodyne measurement signal $I_{het}$, also with a heterodyne angular frequency of $\Delta\omega$. Measurement signal $I_{het}$ and reference signal $I_{ref}$ are graphically depicted as signal plots 1802 and 1804, respectively, in FIG. 18, along with the heterodyne phase shift $\Delta\phi_m$ (=$\Delta\phi_{het}$).

Signal 352 is received at $\Delta\phi_m$ measured phase shift detector 362, which compares measured heterodyne measurement signal $I_{het}$ 352 with reference signal $I_{ref}$ 342 and determines measured phase shift $\Delta\phi_m$. Phase shift $\Delta\phi$ is induced by film 314, and the amount of the phase shift depends on several factors, including the thickness of film 314, the refractive index $n_f$ for the particular film being monitored, and in higher phase shifts, a correction factor. The interrelationship between the factors will be discussed in greater specificity further below. In any case, an accurate film thickness $d_f$ can then be determined by processor 360 from corrected phase shift $\Delta\phi$, which is obtained from measured phase shift $\Delta\phi_m$. However, since measured phase shift $\Delta\phi_m$ has an inherent error, at least at higher phase shifts, accurate thickness measurements are possible only after the measured phase shift is corrected.

Here it should be understood that data processed system 360 may take a variety of forms depending on the particular application. Often data from inline wafer processing is processed in real time on a computer or PC that is electrically coupled to reflectometer detectors 340 and 350 or $\Delta\phi_m$ measured phase shift detector 362. However, in accordance with other exemplary embodiments the reflectometer systems may be pre-configured with internal data processors and/or discrete firmware components for storing and processing monitored data in real time. In accordance with still other exemplary embodiments, the raw measured data from the reflectometer to be handled by a data processing system resident on the wafer process equipment. In that case, the wafer processing firmware performs all data processing for the reflectometer, including thickness computations. Accordingly, heterodyne reflectometer system 300 is depicted with generic data processing system 360, which may include discrete firmware and hardware components. These components generally include measured phase shift corrector 366 and thickness calculator 368. Optionally, system 360 may include error correction data memory 364, the operation of which will be discussed below.

More particularly, $\Delta\phi_m$ phase shift detector 362 receives reference signal $I_{ref}$ 342 and heterodyne measurement signal $I_{het}$ 352 from the respective detectors and measures phase shift $\Delta\phi_m$ between the two. Phase shift detector 362 may use any appropriate mechanism for detecting corresponding points on reference signal $I_{ref}$ and measurement signal $I_{het}$ for phase detection. However, these improvements are discussed separately with regard to FIGS. 25 and 26A-26D.

Although not depicted in the figure, phase shift detector 362 may also be equipped with an I/O interface for entering wavelength and/or oscillator frequency information for facilitating signal detection.

Once measured phase shift $\Delta\phi_m$ has been detected, it is passed to $\Delta\phi_m$ measured phase shift corrector 366 for error correction. The error in measured phase shift $\Delta\phi_m$ may be appreciable at higher phase shifts, but the error can be corrected by applying a polynomial function to $\Delta\phi_m$, with an appropriate set of correction coefficients. As will become apparent from the following discussion corresponding to FIGS. 7-10, the correction coefficients are derived for a specific film refractive index. Furthermore, $\Delta\phi_m$ corrector 366 requires certain parametric data for performing the error correction computations. These data include the source wavelength, $\lambda$, the top film layer refractive index, $n_f$, and the incidence angle, $\alpha$. $\alpha$ will be is typically set at a default, $\alpha=60°$, rather than precisely at the Brewster's angle for the source wavelength and film refractive index $n_f$, the reasons for which will be discussed below.

Finally, $d_f$ thickness calculator 368 receives the corrected phase shift, $\Delta\phi$, from $\Delta\phi_m$ corrector 366 and computes a corrected film thickness $d_f$ for the film being examined, i.e., film 314.

Alternatively, $d_f$ thickness calculator 368 may receive measured phase shift $\Delta\phi_m$ directly from $\Delta\phi_m$ phase shift detector 362 and then algebraically correct the measured thickness with film thickness correction data it fetches from memory 364. The thickness error correction data, or a look-up table (LUT), are loaded into memory 364 beforehand based on the refractive index $n_f$ for film 314.

Still another option is to store a table of corrected thickness values, $d_f$, in memory 364 which are indexed to discrete measured phase shift values. In that case, on receiving $\Delta\phi_m$ from phase shift detector 362, $d_f$ thickness calculator 368 retrieves a corrected thickness value from memory 364 and outputs the value.

The present method relies on the anisotropic reflection of the radiation from the top surface of the film. Therefore, the heterodyne reflectometer set-up is optimally configured with incidence angle $\alpha$ near Brewster's angle. As will be shown directly below, the maximum sensitivity to phase shift for a film is achieved at the Brewster's angle for the refractive index of a particular film under examination. At the Brewster's angle, the amount of reflected p-polarized light from the top surface of the film is nil or minimal. Thus, signal, $I_{het}$, 352 from detector 350 is rich with film-thickness information.

However, as a practical matter, the optical components in a monitoring system may be semi-permanently configured for cooperating with a particular processing apparatus (e.g., at a preset 60° angle of incidence, $\alpha.=60°$). In those systems, adjusting the incidence to precise angle may be difficult or impossible. Nevertheless, as will be shown in the following discussions, one benefit of the presently described invention is that the thickness measurements are highly accurate over a wide range of angles around the Brewster's angle for a particular film's refractive index.

Furthermore, in addition to the anisotropic reflection from the film surface, reflective anisotropy may also be present in the film itself and the bottom film surface or the substrate. It has been assumed that the film material and the lower interface are isotropic for the s- and p-polarizations. However, this assumption may not always be correct for every film type, see T. Yasuda, et al., "Optical Anisotropy of Singular and Vicinal Si—SiO$_2$ Interfaces and H-Terminated Si Surfaces," J. Vac. Sci. Technol. A 12(4), July/August 1994, p. 1152 and D. E. Aspnes, "Above-Bandgap Optical Anisotropies in Cubic Semiconductors: A Visible-Near Ultraviolet Probe of Surfaces," J. Vac. Sci. Technol. B 3(5), September/October 1985, p. 1498. Accordingly, in those situations where the top film and/or the substrate exhibit significant reflectance anisotropy, the optimized incidence angle can be between normal incidence and Brewster incidence.

More specifically, there may be reflective/absorptive anisotropy at all of the following regions of the film: a) top surface; b) media of the film; and/or c) bottom surface. At the top surface of a film, a phase shift may be induced in the measurement signal due to Fresnel reflection, essentially for the reasons and rationale discussed above which relies on the preferential reflection of one polarization at the Brewster's angle over the other polarization. In general, it directly applies to most films and provides large signal to noise. However, scratches on the film surface may contribute to reflection anisotropy thus enhancing this phase shift. The media of the film may also induce a phase shift, especially with regard to ferromagnetic thin film, e.g., disk memory devices, and ferroelectric thin films, e.g., capacitors in CMOS. At the bottom surface of the film, i.e., the interface between the film and the substrate, a phase shift may be induced by crystal orientation, or stained crystalline lattice structures, in addition to ferromagnetic thin films.

By way of example, a lower interface of $SiO_2/Si$ films has been shown to be anisotropic for reflections of s- and p-polarizations in normal incidence. Assuming a top surface and bulk medium of $SiO_2$ are isotropic in normal incidence, a phase shift can be induced in the measurement signal, based on the film thickness. However, in this case, the shift is induced by anisotropic reflection from the lower interface and not the film surface. Here though, the beam may be directed normal to the surface, rather than at the 60° default angle. The presently described method applies to absorption as well as reflection and, furthermore, is applicable to scanning a wafer to produce a map of the film thickness across a surface, such as the surface of a semiconductor wafer.

Returning to the more general case with regard to the anisotropic reflection from the film surface, it will be understood from the discussion below, the heterodyne reflectometer set-up incidence angle $\alpha$ for configuring system 300 is related to, and could change with, the refractive index, $n_f$, of the film under inspection and the wavelength, $\lambda$, of the illumination source. Since different films have different refractive indexes, the angle $\alpha$ could be adjusted correspondingly to changes in the index. If this is desired, a means should be provided for adjusting the incident angle of heterodyne reflectometer system 300 based on the refractive index of the various films to be examined. This may be accomplished by enabling table system 310 and/or prisms 332 and 334 to move. For example, mirrors 332 and 334 may be configured with two degrees of movement, one in a rotational direction about an axis that is perpendicular to the plane of incidence formed by beams 303 and 305, and the normal of film 314, and a translation movement direction that is parallel to the surface normal. Alternatively, mirrors 332 and 334 may have one degree of rotational movement about a direction perpendicular to the plane of incidence and table assembly 310 will then have one degree of translational movement in the normal direction. The latter exemplary embodiment is depicted herein with mirrors 332 and 334 and table assembly 310 (depicted herein as table 315, film 314 and substrate 312) shown with phantom lines indicting movement. The phantom components show incident beam 303 and receiving reflected beam 305 redirected to a different incident angle $\alpha$, in response to a change in the value of refractive index $n_f$. However, as emphasized above and below, using a default incidence angle, $\alpha=60°$, is advantageous over setting the incidence angle precisely at the Brewster's angle for the film and light source.

Figure 3B:
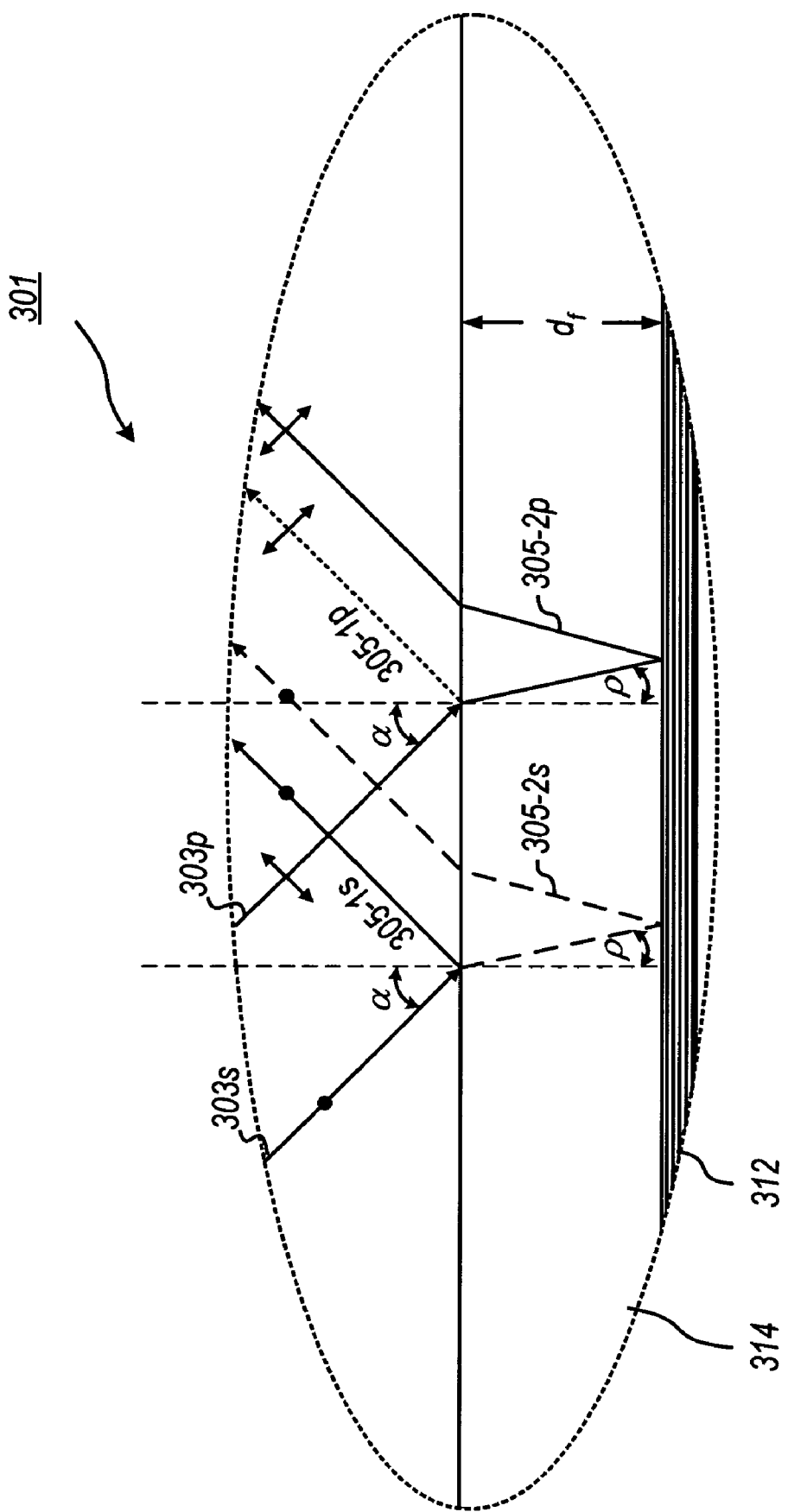
FIG. 3B is a diagram showing the reflection of the linearly polarized incident beam, comprised of an s-polarization component and having an optical angular frequency of $\omega$, and a p-polarization component having a split optical angular frequency of $\omega+\Delta\omega$, with a thin film.

Turning to FIG. 3B, the source of phase shift $\Delta\phi$ attributable to film 314 is depicted. The s-polarization component is depicted as being separated from the p-polarization component for clarity. Incident beam 303 is comprised of s-polarization component 303s (having an optical angular frequency of $\omega$) and p-polarization component 303p (having an optical angular frequency of $\omega+\Delta\omega$), which are orthogonal to each other. Both component 303s and component 303p are incident to the normal of film 314 at angle $\alpha$. At the surface of film 314, a portion of beam component 303s is reflected as reflected ray 305-1s (referred to below as $r_{1s}(\omega)$), while another portion of beam component 303s refracts into film 314 at a refraction angle, $\rho$, then reflects off substrate 312 and refracts out of film 314 as refracted ray 305-2s (referred to below as $r_{2s}(\omega)$). Similarly, beam component 303p is split into a reflected ray 305-1p (referred to below as $r_{1p}(\omega+\Delta\omega)$) and refracted ray 305-2p (referred to below as $r_{2p}(\omega+\Delta\omega)$).

Basic to calculating accurate film thicknesses is optimizing the light interaction with the film to be more sensitive to film thickness, which in turn enhances the heterodyne phase shift, $\Delta\phi_m$. The aim is to increase the phase shift of the heterodyned signal as much as possible from the reference signal, i.e., increase $\Delta\phi_m$. In this invention, for isotropic films and substrates, this is done by optimizing the incidence angle. Since the reflected beam is composed of s- and p-component rays that are both reflected and refracted, it is advantageous for one polarization component to have a greater portion of reflected rays from the film surface than the other. Because s- and p-polarized light with split frequencies is used for the measurement, it is possible to adjust the incident angle, $\alpha$, to achieve this result. As is well understood in the art, linear polarized light will exhibit this result by setting the incident angle to the Brewster's angle for the source wavelength. At Brewster's angle, virtually the entire p-polarization component of incident beam 303p is refracted into the film as 305-2p with very little, if any, reflected as ray 305-1p. Conversely, operating at Brewster's angle, the s-polarization component of incident beam 303s, sees significant reflection as ray 305-1s with the rest penetrating the film as refracted ray 305-2s. Therefore, angle $\alpha$ may be adjusted such that more of one polarized light component is not reflected, but almost totally refracted in the film. Hence, after the rays are mixed, the resulting beam is sensitized for phase shift due to a disproportionate contribution of the s-polarization component reflected from the film's surface. Therefore, it can be appreciated that a phase shift results from the time necessary for refracted components to travel over the increased path distance, $\Delta d = 2d_f \sqrt{n_f^2 - \sin^2\alpha}$.

For isotropic films and substrates, optimally the polarization components for beam 303 are linear and orthogonally to one another and have been referred to as such throughout the specification. However, elliptically polarized components will also yield a similar thickness induced phase shift, albeit somewhat decreased. Therefore, in accordance with other exemplary embodiments of the present invention the split frequency of beam 303 are elliptically polarized.

According to aspects of the present invention, highly sensitive thickness determinations are realized by using an off-axis illumination approach to heterodyning polarized signals. This aspect of the present invention relies on the anisotropic reflection of the electromagnetic radiation from the top surface of the film when the angle of reflection is near the Brewster's angle. The reasons for utilizing this methodology over the prior art common- or normal-axis approach will be addressed directly below, but it should be recognized that the angle of incidence may be at normal incidence in cases where the substrate exhibits significant reflectance anisotropy at normal incidence.

For a single film stack, the s-polarization reflectance can be written as:

$$r_s = \frac{r_{1s} + r_{2s}e^{-i2\delta}}{1 + r_{1s}r_{2s}e^{-i2\delta}} \tag{2}$$

Similarly, the p-polarization reflectance is given as:

$$r_p = \frac{rp + r_{2p}e^{-i2\delta}}{1 + r_p r_{2p}e^{-i2\delta}} \tag{3}$$

where $\delta = \frac{2\pi}{\lambda}\sqrt{n^2 - \sin^2\alpha} \times d$ $\delta$ is the phase shift attributable to the film thickness;
$\alpha$ is the angle of incidence;
n is the refractive index of the film; and
d is the film thickness.

When the two polarizations are mixed, the resultant amplitude-reflectance sensed by the detector can be written as:

$$r_{eff} = (r_s e^{i\omega t} + r_p e^{i(\omega+\Delta\omega)t}) \times \cos 45° \tag{4}$$

The power reflectance is $$R_{eff} = r_{eff} \times r_{eff}^* \times (\cos 45°)^2 \tag{5}$$

$r_{eff}$ is the resultant amplitude-reflectance from a detector; and
$r_{eff}^*$ is a complex conjugate of $r_{eff}$.

After substituting Equations (2), (3), and (4) in Equation (5), it can be expressed as:

$$R_{eff} = \frac{r_{1s}^2 + r_{2s}^2 + 2r_{1s}r_{2s}\cos 2\delta}{1 + r_{1s}^2 r_{2s}^2 + 2r_{1s}r_{2s}\cos 2\delta} + \frac{r_{1p}^2 + r_{2p}^2 + 2r_{1p}r_{2p}\cos 2\delta}{1 + r_{1p}^2 r_{2p}^2 + 2r_{1p}r_{2p}\cos 2\delta} + \tag{6}$$

$$\frac{2[(1+ab)g + bc + ad + (1+ab)f]\cos(\Delta\omega t)}{1 + a^2 + b^2 + 2ab + a^2b^2 + 2(a+b+a^2b+ab^2)\cos 2\delta + 2ab\cos 4\delta} +$$

$$\frac{2[ag + (1+ab)c + af]\cos(\Delta\omega t + 2\delta)}{1 + a^2 + b^2 + 2ab + a^2b^2 + 2(a+b+a^2b+ab^2)\cos 2\delta + 2ab\cos 4\delta} +$$

$$\frac{2[bg + (1+ab)d + bf]\cos(\Delta\omega t + 2\delta)}{1 + a^2 + b^2 + 2ab + a^2b^2 + 2(a+b+a^2b+ab^2)\cos 2\delta + 2ab\cos 4\delta} +$$

$$\frac{2ac\cos(\Delta\omega t + 4\delta)}{1 + a^2 + b^2 + 2ab + a^2b^2 + 2(a+b+a^2b+ab^2)\cos 2\delta + 2ab\cos 4\delta} +$$

$$\frac{2bd\cos(\Delta\omega t - 4\delta)}{1 + a^2 + b^2 + 2ab + a^2b^2 + 2(a+b+a^2b+ab^2)\cos 2\delta + 2ab\cos 4\delta}$$

where $a = r_{1s}r_{2s}$, $b = r_{1p}r_{2p}$, $c = r_{1s}r_{2p}$, $d = r_{1p}r_{2s}$, $f = r_{2s}r_{2p}$, $g = r_{1s}r_{1p}$ The first two terms of Equation (6) represent the standard homodyne reflectance by the s- and p- polarized light. For a given wavelength and film thickness, these terms contribute a time invariant (dc) value to the power reflectance. The next five terms represent the heterodyne reflectance resulting from coherent addition of s- and p-polarized light at the polarization mixer.

The third term whose phase is determined only by $\Delta\omega t$ is not influenced by thickness change. On the other hand, the terms that contain cos $(\Delta\omega t \pm 2\delta)$ and cos $(\Delta\omega t \pm 4\delta)$ could shift the phase of the beat signal as the film thickness changes. In a classical heterodyne interferometry, measured phase shift will be directly proportional to path-length or thickness change. However, because of the non-linear nature of Equation (6), the measured phase shift may only be an indication of thickness change and not a direct measure of it.

Interestingly, both $+\delta$ and $-\delta$ contributes to the phase shift. Consequently, a zero phase-shift occurs at normal incidence for any thickness change. This was verified by simulated results. This can be understood by realizing that at normal incidence (i.e., common-axis incidences of the prior art), the coefficient of cos $(\Delta\omega t+2\delta)$ is the same as that of cos $(\Delta\omega t-2\delta)$ and the coefficient of cos $(\Delta\omega t+4\delta)$ is the same as that of cos $(\Delta\omega t-4\delta)$. Hence, the phase shift induced by one is balanced by the other.

Figure 1:
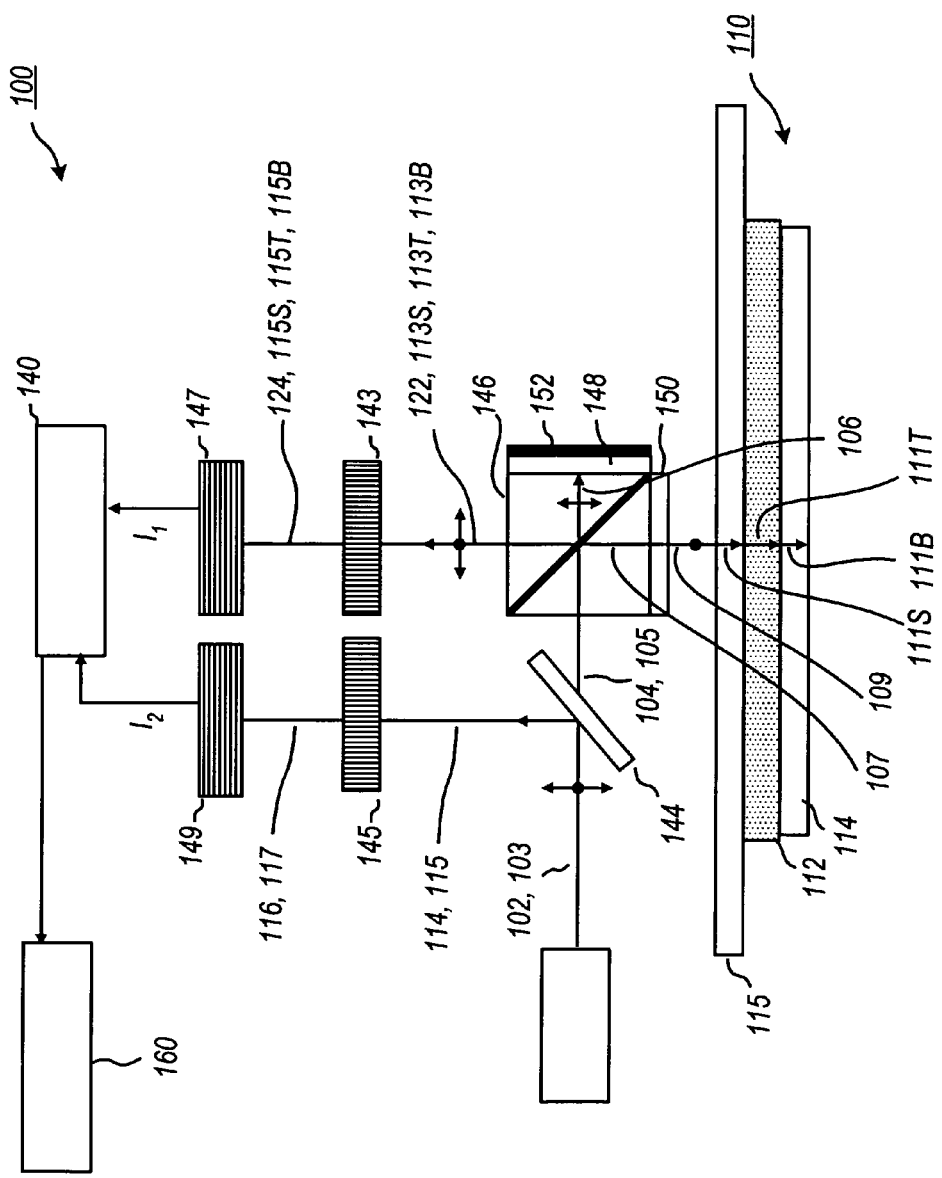
FIG. 1 is a diagram of a heterodyne interferometer as is generally known in the prior art.
Figure 4:
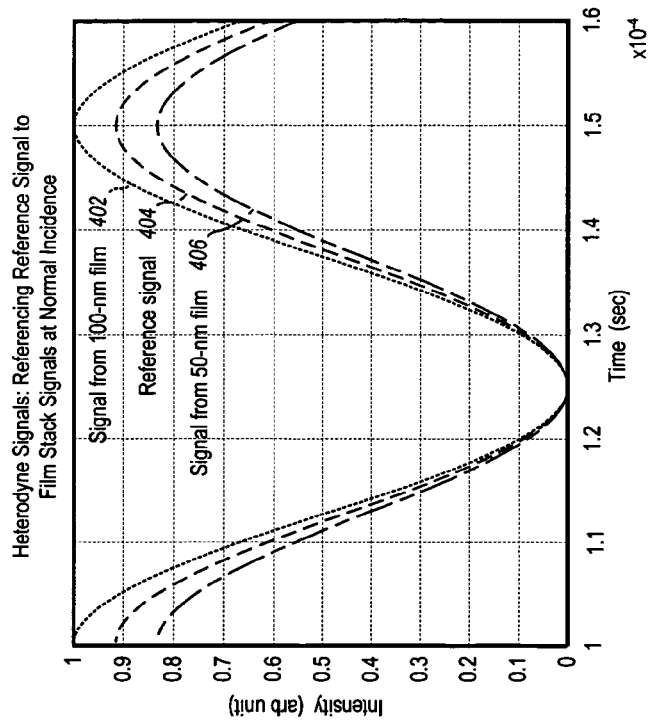
FIG. 4 is a diagram of a plot of intensities versus time for simulation results taken at normal incidence.

FIG. 4 is a diagram of a plot of intensities versus time for simulation results taken at normal incidence ($\alpha=0.0°$). From the diagram it is apparent for a 100 nm film, a plot of measures signal 402, is aligned with the reference signal, reference signal plot 404, i.e., the measurement signal for a 100 nm film and the reference signal are in phase at normal incidence. Furthermore, the thickness of the film being measured does not alter this result. Notice that similar to the 100 nm film, the plot of measurement signal 406 for a 50 nm film, is also in phase with plot of a local reference plot 404, i.e., the measurement signal for a 50 nm film and the reference signal are in phase at normal incidence.

In contrast with the normal axis mode, in the off-axis mode the pairs of coefficients (cos $(\Delta\omega t \pm 2\delta)$ and cos $(\Delta\omega t \pm 4\delta)$) are different. Thus, it is possible to detect and measure a thickness-induced phase-shift in isotropic materials using a heterodyne reflectometer.

Figure 5:
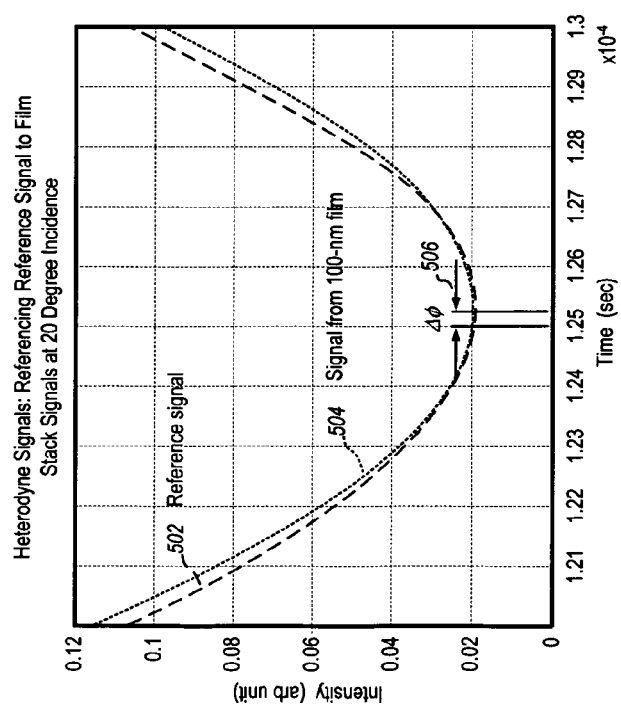
FIG. 5 is a diagram of a plot of intensities versus time for simulation results taken at an angle of incidence of 20.0°.

FIG. 5 is a diagram of a plot of intensities versus time for simulation results taken at a 20.0° angle of incidence ($\alpha=20.0°$). As is apparent for this diagram, plot 504 of the measurement signal for a 100 nm film is phase shifted from the reference signal, reference plot 502, by $\Delta\phi$ ($=\Delta\phi_m$).

However, at incidence angle $\alpha=20.0°$, phase shift $\Delta\phi$ for 100-nm thickness change is quite small. Therefore, the configuration of the heterodyne reflectometer should be optimized toward being more sensitive to thickness in order to be more useful for real time thin film thickness/change monitoring.

If the incidence angle is the Brewster's angle for the top film, then $r_{1p}$ will be close to zero. In other words, by selecting the incidence angle such that $\alpha$ is at Brewster's angle, only the s-polarization component will be reflected. Most of the p-component will be refracted into the film and will be reflected at the film substrate interface. With regard to plasma etching or deposition processes, Brewster's angle is given as arctan $(n_f/n_p)$, where $n_p$ is the refractive index of the gas in the process chamber, and $n_f$ is the refractive index for the top film layer. In that case, Equation (5) can be re-written as follows:

$$R_{eff} \approx \frac{r_{1s}^2 + r_{2s}^2 + 2r_{1s}r_{2s}\cos 2\delta}{1 + r_{1s}^2 r_{2s}^2 + 2r_{1s}r_{2s}\cos 2\delta} + \frac{r_{2p}^2}{1} + \tag{7}$$

$$\frac{2f\cos(\Delta\omega t)}{1 + a^2 + 2a\cos 2\delta} + \frac{2[c + af]\cos(\Delta\omega t + 2\delta)}{1 + a^2 + 2a\cos 2\delta} + \frac{2ac\cos(\Delta\omega t + 4\delta)}{1 + a^2 + 2a\cos 2\delta}$$

where $a = r_{1s}r_{2s}$, $b = r_{1p}r_{2p}$, $c = r_{1s}r_{2p}$, $d = r_{1p}r_{2s}$, $f = r_{2s}r_{2p}$, $g = r_{1s}r_{1p}$.

In the above equation, the heterodyne terms with phase information is due to coherent addition of terms that involve $r_{1s}$ ($\omega$) and $r_{2p}$ ($\omega+\Delta\omega$). This is somewhat similar to the classical heterodyne interferometer and without the noise associated with separating the reference beam from the measurement beam.

Figure 6:
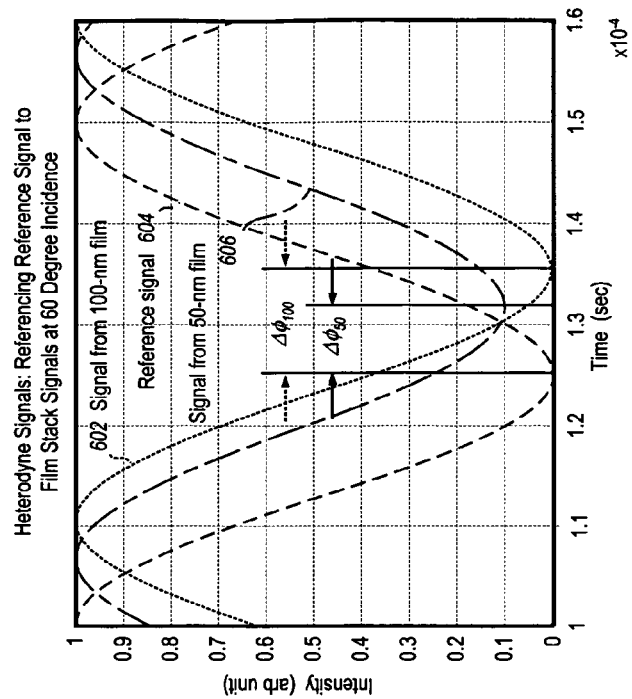
FIG. 6 is a diagram of a plot of intensities versus time for simulation results taken for two different film thicknesses at an angle of incidence of 60°.

FIG. 6 is a diagram of a plot of intensities versus time for simulation results taken for two different film thicknesses at 60° angle of incidence ($\alpha=60.0°$) (here it should be understood that the incidence angle $\alpha$ is set at 60.0° even though the Brewster angle for many may be closer to 57°). Notice from the diagram that both the plot of measurement signal 602, for a 100 nm film, and the plot of measurement signal 606, for a 50 nm film, are significantly phase shifted from the reference signal, local reference signal plot 604 and from each other. A comparison to the diagram of FIG. 5 reveals that the observed shift for the 60° angle of incidence is significantly larger than for a 20° angle of incidence. The elimination of terms that contain ($\Delta\omega t - \delta$) appears to make the technique more sensitive to thickness change.

Once the configuration of the heterodyne reflectometer is optimized toward being more sensitive to thickness, a calculation for determining thickness from phase shift $\Delta\phi$ can be established. In the classical heterodyne interferometer, the phase shift is measured and a corresponding change in the beam path difference, $\Delta d$, can be calculated using the following expression:

$$\Delta\phi = 4\pi \times \Delta d/\lambda \quad (8)$$

$\Delta\phi$ is the phase shift of the measured signal, $I_{het}$, with respect to the reference signal $I_{ref}$,
$\Delta d$ is the corresponding beam path difference; and $\lambda$ is wavelength of the heterodyne illumination source.
Thus:

$$\Delta d = \Delta\phi \lambda / 4\pi \quad (9)$$

In heterodyne reflectometry, since $\Delta\phi = 2\delta$, and $$\delta = \frac{2\pi}{\lambda} \sqrt{n^2 - \sin^2\alpha} \times d, \text{ the}$$

thickness of the film can then be found by the following equation:

$$d = \left( \frac{\Delta\phi \times \lambda}{4\pi \times \sqrt{n^2 - \sin^2\alpha}} \right) \quad (10)$$

In simulation using Equation (6), heterodyne reflectance signals corresponding to film thicknesses from 0 to 100 nm (1000 Å) are generated. Then phase shift, $\Delta\phi$, of each signal is then estimated with reference to the reference signal. From the estimated phase values, the corresponding values of film thickness were predicted/computed using the Equation (10).

The measured thicknesses are then compared to the input thickness. The difference between the measured thicknesses and the input (known) thicknesses is a function of the error in the measured phase shift, $\Delta\phi_m$.

$$\Delta\phi_m = \frac{4\pi d \times \sqrt{n^2 - \sin^2\alpha}}{\lambda} \quad (11)$$

$\Delta\phi_m$ is the phase shift of the measured signal, $I_{het}$, with respect to the reference signal $I_{ref}$, d is the film thickness estimated from the measured phase shift $\Delta\phi_m$;
n is the refractive index of the film;
$\alpha$ is the angle of incidence; and
$\lambda$ is wavelength of the heterodyne illumination source.

Figure 8:
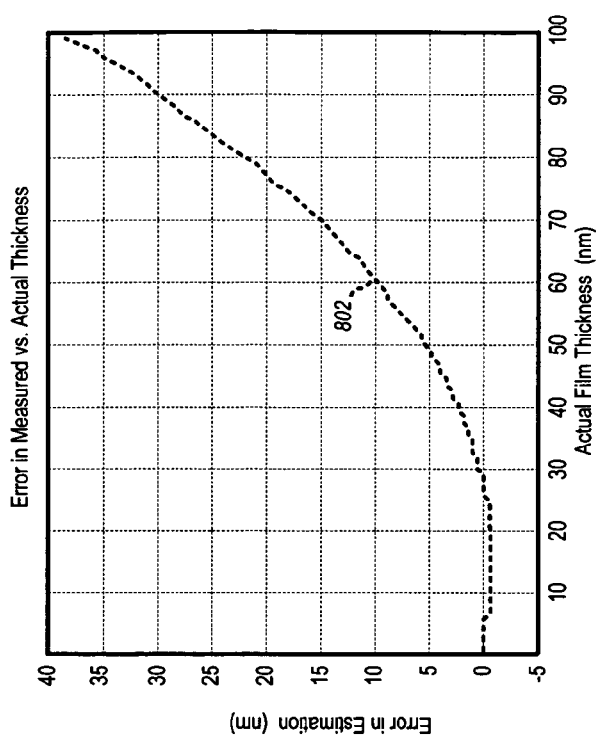
FIG. 8 is a diagram of a comparison between error and input thickness showing the amount of error between the actual and measured (estimated) thicknesses of a thin film.
Figure 7:
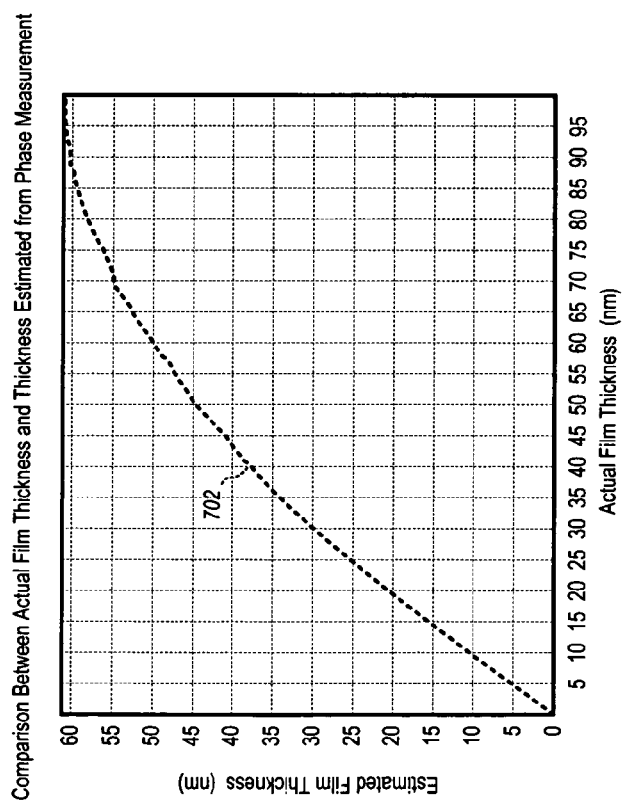
FIG. 7 is a diagram of a comparison between estimated film thicknesses and actual film thicknesses for an incidence angle of 60°.

FIG. 7 is a diagram of a comparison between estimated film thicknesses and actual film thicknesses, with an incidence angle of 60°. From comparison plot 702, it can be understood that for film thickness up to about 300 Å, the predicted thickness agrees well with the input thickness and plot 702 is relatively linear. Beyond a thickness of 300 Å, error in the predicted values increases with thickness at a non-linear rate. Error vs. input thickness is depicted in the diagram of FIG. 8, with error plot 802 depicting the amount of error between the actual and measured thicknesses of a thin film.

From FIGS. 6 and 7, it is appreciated that the amount of error up to 300 Å is zero or negligible, but error increases rapidly beyond that. Nevertheless, this error can be quantified and an error calculation formulated for its removal. One mechanism for counteracting the error is by fitting a higher order polynomial function to error curve 802. By using the coefficients of the polynomial function derived from actual film thicknesses and estimated thickness, calculated from the measured phase shift $\Delta\phi_m$ and actual phase shift $\Delta\phi$, the error in the thickness calculation can be determined. Then, by simply including the polynomial error function in the thickness calculation (i.e., correcting the measured phase shift $\Delta\phi_m$), the expected value of film thickness (i.e., the actual film thickness) can be obtained. Alternatively, an estimated thickness value obtained from phase shift measurements can be corrected by algebraically adding a thickness error correction value directly to the estimated thickness.

Figure 10:
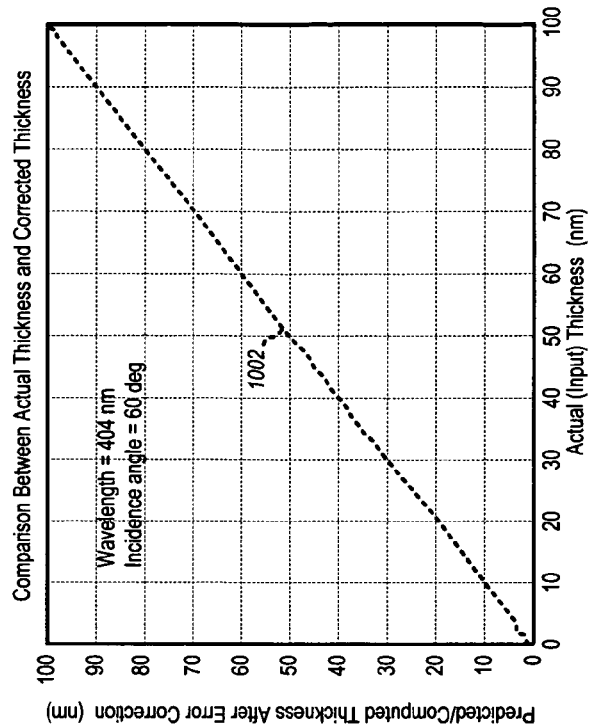
FIG. 10 is a diagram of a comparison between a corrected film thicknesses and actual film thicknesses for source wavelength of 404 nm and incidence angle of 60° for thicknesses between 0 and 1000 Å.
Figure 9:
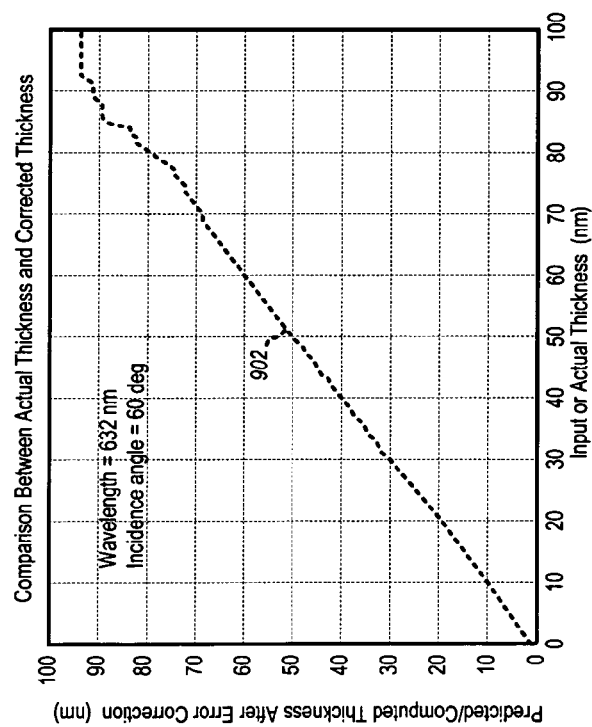
FIG. 9 is a diagram of a comparison between a corrected film thicknesses and actual film thicknesses for source wavelength of 632 nm and incidence angle of 60° for thicknesses between 0 and 1000 Å.

FIGS. 9 and 10 demonstrate the validity of the error calculation for finding film thickness for an incidence angle of 60°. Curve 902 shows that for a 632 nm laser, the estimated thickness results after the error correction are extremely accurate up to 700 Å and very good until the 900 Å range. Only after the estimated thickness value exceeds the 900 Å thickness does the error correction break down. From curve 1002 in FIG. 10, it can be seen that the error correction results for a 404 nm laser remain accurate even beyond the 900 Å thickness barrier for measurements using the 632 nm laser.

From the discussion above, it is apparent that the most accurate results for film thickness are obtained when the refractive index, $n_f$, is known for the top film layer. From the simulation results presented above, it has been demonstrated that the heterodyne reflectometer configured properly is extremely useful in determining film thickness in the sub 200 nm region. Accurate thickness results can be achieved in film thicknesses greater than 300 Å by determining an error correction for the thickness calculated from the phase shift. In accordance with one exemplary embodiment of the present invention, a thickness/phase shift error correction is determined in advance. With a predetermined correction, the subsequent in situ monitoring of film thickness may achieve real time and accurate thickness during wafer processing.

FIG. 11 is a flowchart depicting a process for determining coefficients for a phase shift correction polynomial function for use in determining heterodyne phase shift measurements in accordance with an exemplary embodiment of the present invention. The process begins by selecting a number of calibration wafers having a single known refractive index, $n_f$, and a plurality of known thicknesses $d_{fk1-j}$ (step 1102). The refractive index is the common factor and, therefore, the coefficients for thickness error correction polynomial function will be index specific. The refractive index for each of the calibration wafers should be identical to the index of the top layer film in a production run to assure accurate thickness calculation results. Typically, single layer NIST traceable oxide wafer are available in a variety of refractive indexes and film thicknesses for this purpose, but any wafers having known film thicknesses and common known refractive index will suffice. For a typical wafer etch or deposition process, the film thickness of the selected calibration wafers should range from 10 Å to 100 Å in 5 Å increments.

Next, incident angle $\alpha$ is adjusted for the heterodyne reflectometer system based on the known refractive index, $n_f$ of the calibration film and on the wavelength of the illumination source (step 1104). Optimally, the incidence angle should be set as near to the Brewster's angle for the refractive index of the film as possible. However, certain monitoring systems may not be configurable, but are preconfigured with a default incidence angle, such as $\alpha = 60°$ and, therefore, are impossible to adjust the incidence to Brewster's angle. Nevertheless, it has been discovered that many of the commercially available films have a Brewster's angle within a few degrees of the default incidence angle of $\alpha = 60°$ (typically, slightly less than 60°). Since many of the systems are preconfigured at default angle, any additional error due to signal noise is negligible. Consequently, it may be advantageous to derive the coefficients for the polynomial function at a predetermined default, e.g., $\alpha = 60°$, rather than the precise Brewster's angle for the film. In so doing, the coefficients will be appropriate for the preconfigured systems having a default incidence angle of $\alpha = 60°$, and those configurable systems can simply have the incidence angle adjusted to the 60° default value, albeit slightly higher than the Brewster's angle for the film. It should be understood that substantially more error in the thickness measurement error results from incorrectly adjusting the incidence angle, or using an inappropriate polynomial function for the incidence angle, than from the incidence being a few degrees off of the Brewster's angle for the film.

In operation, the split frequency polarized beam is reflected off the film in the heterodyne reflectometer system, resulting in the generation of a heterodyne measurement signal $I_{het}$, for each of the j wafers and a reference signal $I_{ref}$ (step 1106). The measurement signal will be phase shifted from the reference signal by an amount related to the film thickness. The measured phase shift $\Delta\phi_{m1-j}$ is detected from the phase of reference signal $I_{ref}$ and the phase of measurement signal $I_{het}$ for each of the j calibration wafers (step 1108). With the measured phase shift information, the coefficients of a $6^{th}$ order polynomial function can be determined that relates to error in the estimated thickness obtained from the measured phase shift $\Delta\phi_{m1-j}$ to the known thicknesses $d_{kf1-j}$ and for the known refractive index $n_f$ (step 1110). This may be accomplished using the phase difference algorithm, for example Equation (11), and finding the actual $\Delta\phi$ from the known thicknesses $d_{kf1-j}$ and known refractive index $n_f$ of the wafers. Subsequently, the $6^{th}$ order polynomial function may be applied to measured phase shifts for correcting the inherent error in $\Delta\phi_m$, thereby finding a corrected film thickness.

Essentially, the error correcting polynomial function can be used in one of at least three ways for obtaining an accurate film thickness. First, the polynomial function can be loaded directly onto the data processing system and executed on the fly with the thickness calculation for error correcting estimated thickness from the measured phase shift $\Delta\phi_m$. Alternatively, the polynomial function can be used in conjunction with a thickness calculation for creating a set of thicknesses error corrections, beforehand, which are compiled in a table and associated with discrete measured phase shift $\Delta\phi_m$ values. Optionally, a data set of error corrected thicknesses may be created with the polynomial function and a thickness calculation, instead of thickness error corrections, and also indexed in a table to discrete measured phase shift $\Delta\phi_m$ values. If a table of thickness error corrections is compiled, during operation the data processor calculates a measured thickness $d_m$ from the measured phase shift $\Delta\phi_m$, and then corrects the error in $\Delta\phi_m$ with an appropriate thickness error correction from the table. Alternatively, if the error corrected thickness data are to be used, the data processor merely accesses an error corrected thickness measurement from the table for each measured phase shift $\Delta\phi_m$ obtained for the signals, thereby eliminating the necessity for the data processor to execute the thickness calculation.

Here it should also be understood that correction coefficients derived on one physical machine, might not translate well to another apparatus, i.e., error correction accuracy may suffer, to some extent, even if the two are configured identically. In other words, the coefficients derived for the phase shift error correction polynomials may be, at least partially, device specific. Therefore, ideally $\Delta\phi_m$ should be acquired from the same apparatus to be used for measuring film thicknesses. Nonetheless, the appropriateness of a set of coefficients for a particular production appliance may be verified by measuring the film thicknesses of a set of verification wafers, each verification wafer with a film having a common refractive index and known film thickness within the range of the film to be monitored. The refractive index of the verification wafers should be similar to that of the film to be monitored.

The process ends with the $6^{th}$ order polynomial function being read into the RAM memory of the data processor prior to commencing the production run, where it will be executed within a film thickness calculation for obtaining real time corrected $\Delta\phi$ for each measured $\Delta\phi_m$ from which error corrected thicknesses are generated (step 1112). Alternatively, the $6^{th}$ order polynomial function can be saved for future use. Since the accuracy of the set coefficients derived for error corrected thickness results is dependent on refractive index $n_f$, and the setup parameters used for measuring the calibration wafers (i.e., the source wavelength, $\lambda$, and the incidence angle, $\alpha$), the index information should be retained with the respective correction coefficients.

Optionally, a LUT with either thickness error corrections or error corrected thicknesses is saved or loaded directly into memory for immediate usage (step 1112). As with the error correction polynomial, the reference refractive index and configuration parameters should be saved with the LUT.

As mentioned immediately above, it is expected that in many cases the heterodyne monitoring apparatus will not be configurable. In those cases, an appropriate polynomial function must be identified based on the refractive index and on the configuration parameters that are preset on the specific apparatus. Although it is expected that many monitoring systems will be preconfigured with customary values, i.e. $\alpha = 600$ and $\lambda = 404$ nm or 632 nm, others may also exist. To that end, it will be appreciated that having a multiple sets of correction coefficients available, which are appropriate for non-customary configuration parameter values, would substantially increase the applicability of the heterodyne reflectometry film thickness measurement process to those system. Therefore, with regard to an alternative exemplary embodiment, a plurality of sets of correction coefficients for the polynomial function may be derived, in advance, for a specific refractive index and for a range of configuration parameter values using a configurable monitoring system, e.g., wavelengths and incidence angles. This may be accomplished by iterating through the calibration process depicted in the flowchart of FIG. 11 and resetting α to angle(s) other than the Brewster angle for the film (see step 1104). Separate set correction coefficients for the polynomial function may be found for each combination of configuration parameter values, with respect to each refractive index. The appropriateness of a set of coefficients for a particular production appliance must be verified for use on a particular physical apparatus by measuring/verifying known thickness on a set of verification wafers prior to initiating a production run. In a similar manner, sets of correction coefficients may be derived for various source wavelengths by iterating through the calibration process using light sources having different wavelengths. Thus, the presently described invention may be adapted to a variety of system configurations without sacrificing accuracy in the thickness measurement.

The present invention facilitates the computation of highly accurate film thicknesses on the fly through the use of the error correcting thickness equation. As briefly discussed above, one extremely useful application for the present invention is for achieving real time film thickness results during wafer etching or deposition processes and the like.

Figure 12A:
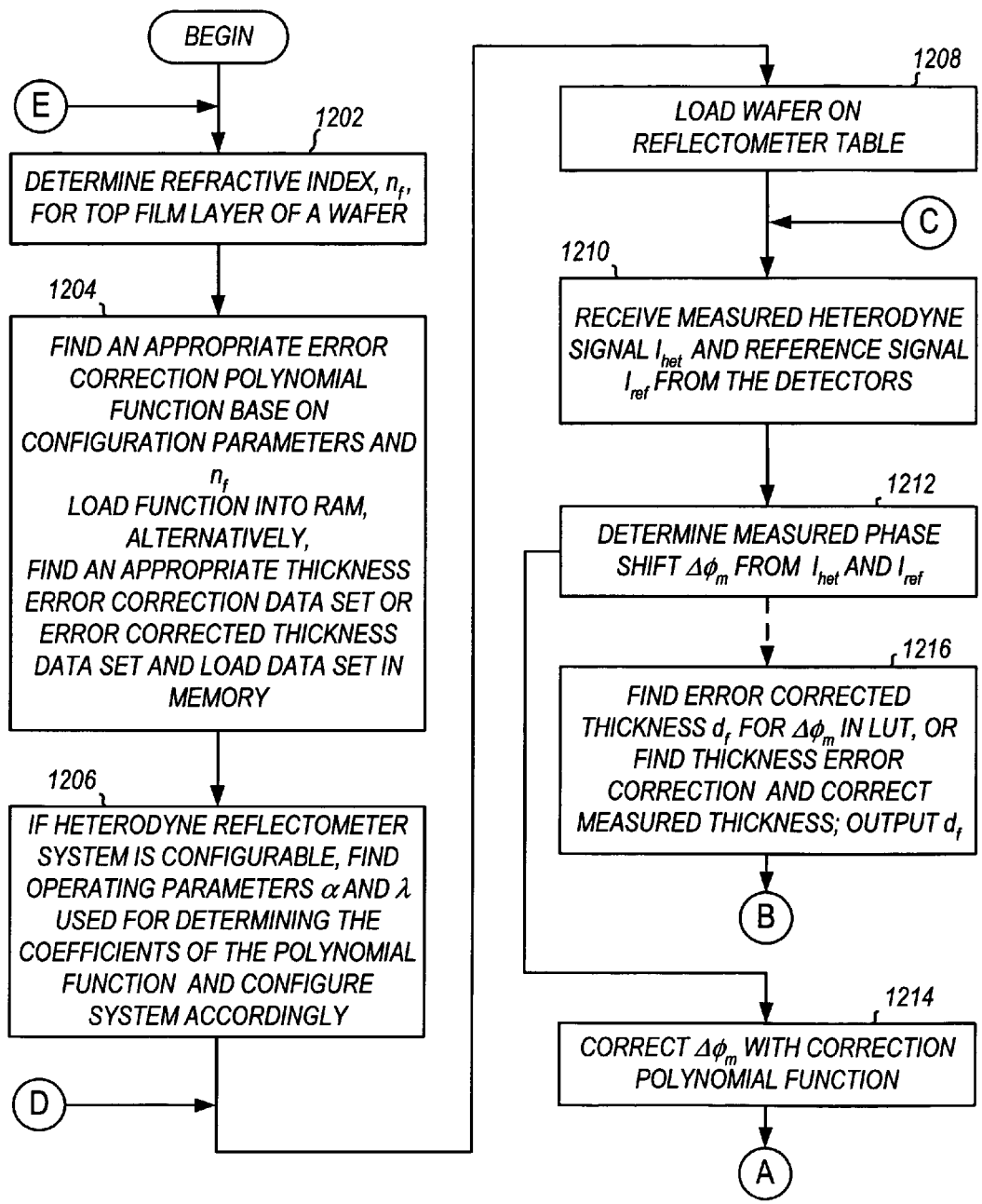
FIGS. 12A and 12B are a flowchart of a process for obtaining highly accurate film thicknesses from heterodyne reflectometer signals in accordance with an exemplary embodiment of the present invention.
Figure 12B:
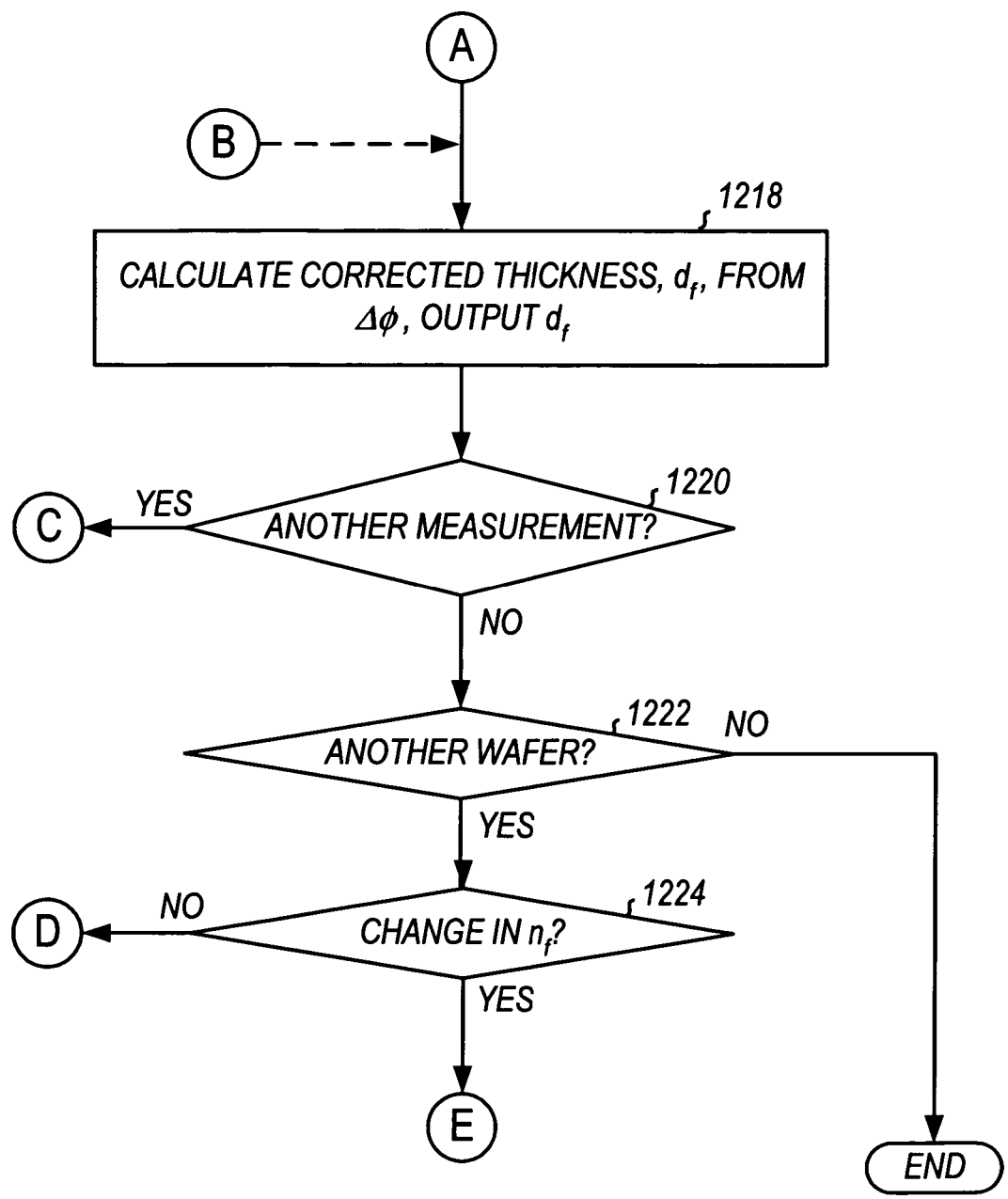

FIGS. 12A and 12B are a flowchart of a process for obtaining highly accurate film thickness measurements from heterodyne reflectometer signals in accordance with an exemplary embodiment of the present invention. The process begins by determining an initial refractive index $n_f$ for the top film layer of a wafer, e.g., a production wafer (step 1202). Next, a set of coefficients for the $6^{th}$ order polynomial function is identified that is appropriate for the film refractive index $n_f$ and the function is loaded into system RAM (step 1204). If the system is preconfigured at a predetermined incidence angle, the set of correction coefficients must also be selected on the basis of the referenced incidence angle, since the system incidence angle cannot be adjusted.

The polynomial function is used for correcting error in the measured phase shift, $\Delta\phi_m$, which, once corrected, can be used for calculating accurate film thicknesses, $d_f$. However, obtaining error corrected film thicknesses $d_f$ can generally be determined by one of two basic procedures discussed above: determining the corrected film thickness on the fly by using the polynomial function; or by precomputing thickness error corrections or corrected thickness value for a lookup table. The thickness error corrections are used to correct measured thickness values, $d_m$, obtained from the measured phase shift $\Delta\phi_m$. Alternatively, corrected thickness values may simply be looked up in the table based on a measured phase shift. In either of the latter cases, a LUT with correction data that is appropriate for the film refractive index $n_f$ is loaded into system memory (step 1204). Assuming the heterodyne reflectometer monitoring system is configurable, it is then reconfigured based on the configuration parameters referenced with the function (i.e., the light source wavelength, λ, and the incidence angle, α) (step 1206).

It is expected that a typical production run will consist of many process wafers, each having a matching film refractive index, therefore, the previously described steps need not be repeated for subsequent wafers in a typical production run. The thickness measurements can now proceed.

A wafer is loaded onto the reflectometer table (step 1208) and illuminated with the beam described above with respect to the description of FIG. 3A. The reflected reference and measurement beams from the film layer are detected and converted to reference signal $I_{ref}$ and measured heterodyne signal $I_{het}$, respectively. Signals $I_{het}$ and $I_{ref}$ are received at (measured phase shift) $\Delta\phi_m$ detector (step 1210), which determines measured phase shift $\Delta\phi_m$ from the phase of the signals (step 1212). Next, $\Delta\phi_m$ is corrected for error using the polynomial function with the correction coefficients (step 1214). With corrected phase shift $\Delta\phi$, corrected film thickness $d_f$ can be determined using a standard thickness calculation, such as Equation (10), (step 1218), and output for use in, for example, an endpoint algorithm.

Returning to step 1212, as mentioned with regard to step 1204, measured phase shift $\Delta\phi_m$ may instead be used in the thickness calculation, but the error will be carried through to the result, measured thicknesses, $d_{fm}$. This thickness error can be eliminated by applying a thickness error correction to $d_{fm}$ (step 1216). In that case, thickness error correction data set will have been loaded into memory and discrete thickness correction values retrieved as necessary based on measured phase shift $\Delta\phi_m$ and corrected film thickness $d_f$ is then output (step 1218). Alternately still, the set of error corrected thickness data may be loaded into memory, which is accessed for thickness values based on discrete measured phase shifts. Thus the thickness calculations need not be performed since the thickness data will have been preprocessed and indexed to measured phase shift values.

Assuming the process is not halted, the flow iterates from step 1210 until all thickness measurements are completed for the wafer (step 1220). Upon completion, a check may be made for another wafer (step 1222). If no other wafer is to be processed, the process ends, otherwise the refractive index of the film on the new wafer is checked against the refractive index of the previous wafer (step 1224). If the two match, the process begins by loading the new wafer onto the reflectometer table (step 1208) and continues from there. Since the index does not change, neither will the correction polynomials nor the system configuration. If, however, the refractive index from the new wafer and previous wafer do not agree, then the present set of correction coefficients is not appropriate and a different correction polynomial function is selected. If the reflectometer system is configurable, the reflectometer system should be reconfigured for the new refractive index. Thus, the process begins again from step 1202. In either case, the measurement process continues as described above until the final thickness measurement is taken from the last wafer in the run. The process then ends.

The discussion above is predominately centered on single layer, thin film applications. However, as will be demonstrated below, the error transformation can be extended to multiple stacks. Initially, though, it is postulated that more complex stacks may require two laser wavelengths, and consequently, two separate thickness corrections are necessary for accurately evaluating thicknesses for a thickness interval of interest. Test results are presented below for monitoring sub 2000 Å film thickness.

Figure 13:
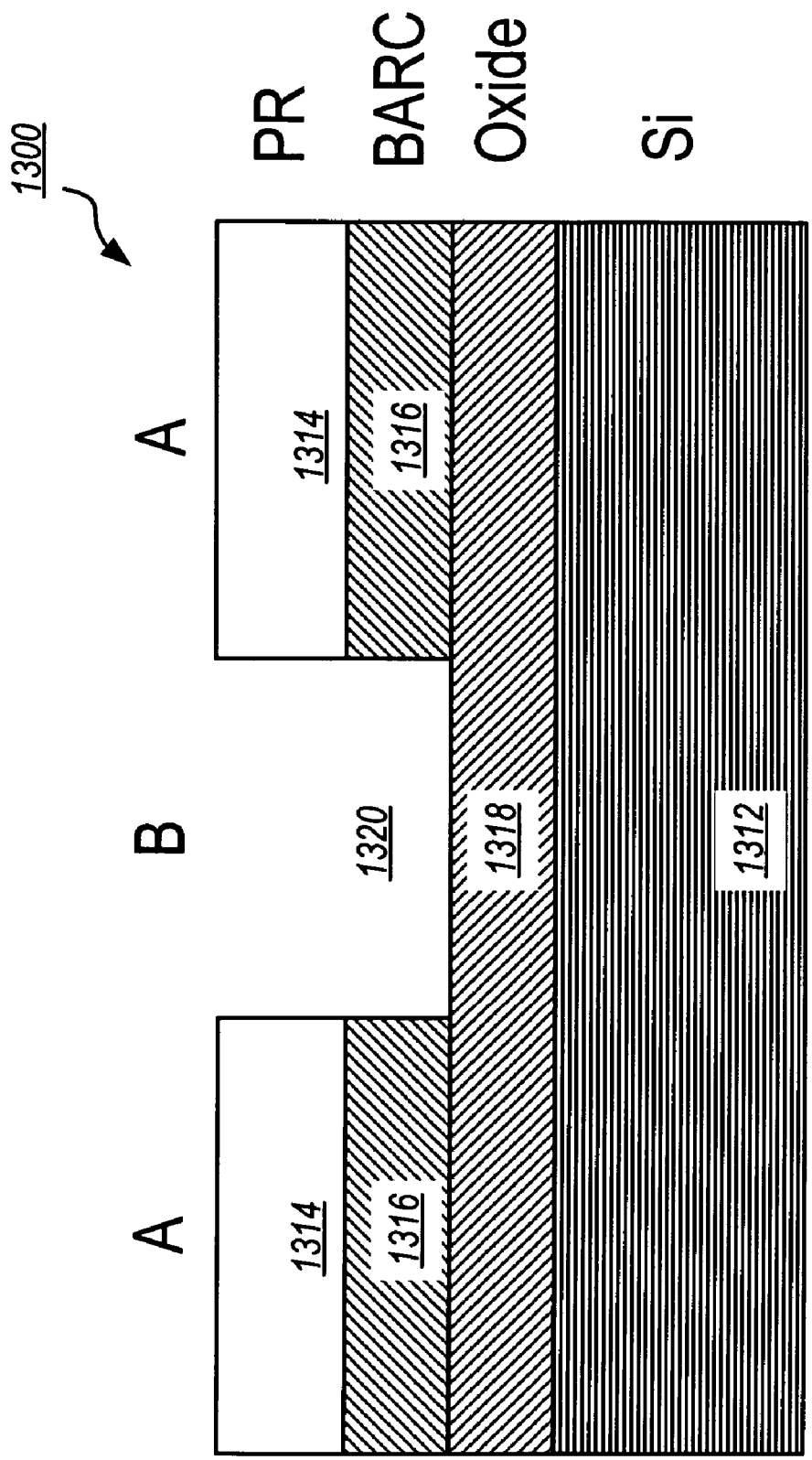
FIG. 13 is a diagram of a multi-layered stack with trenching.
Figure 14B:
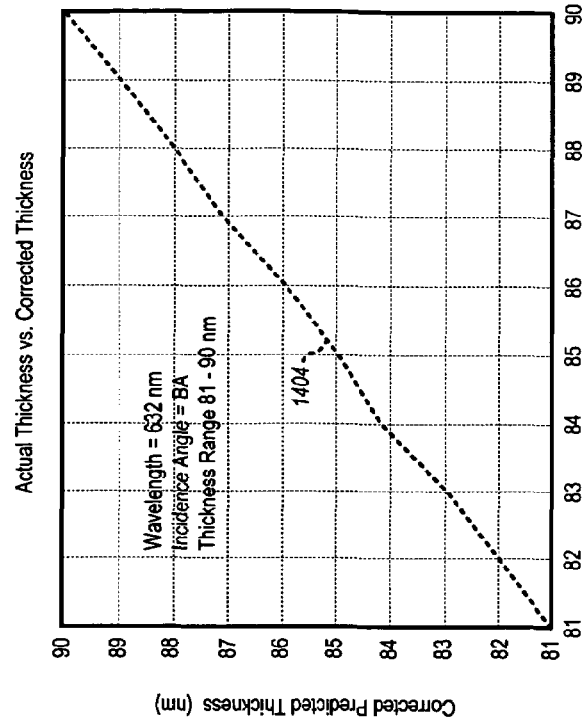
FIGS. 14A-14D are diagrams depicting the plot of the predicted thickness as a function of input thickness over a thickness interval of 0 Å-2000 Å.
Figure 14A:
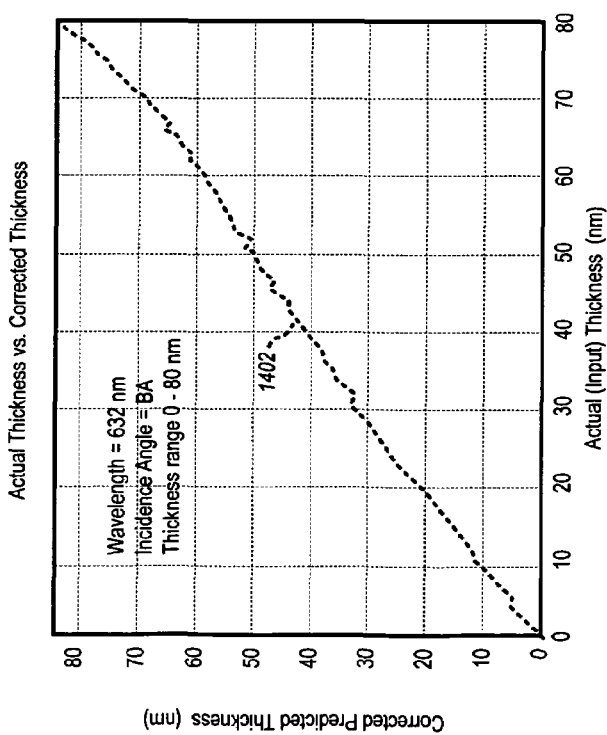
Figure 14D:
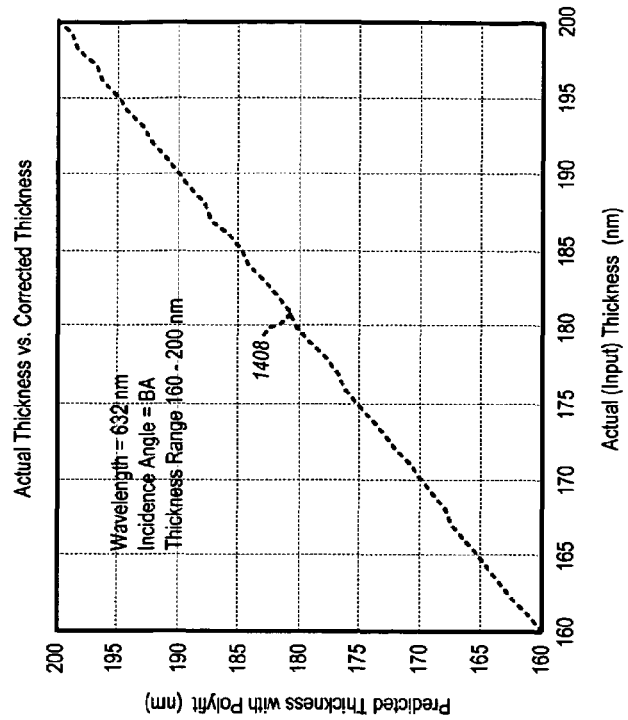
Figure 14C:
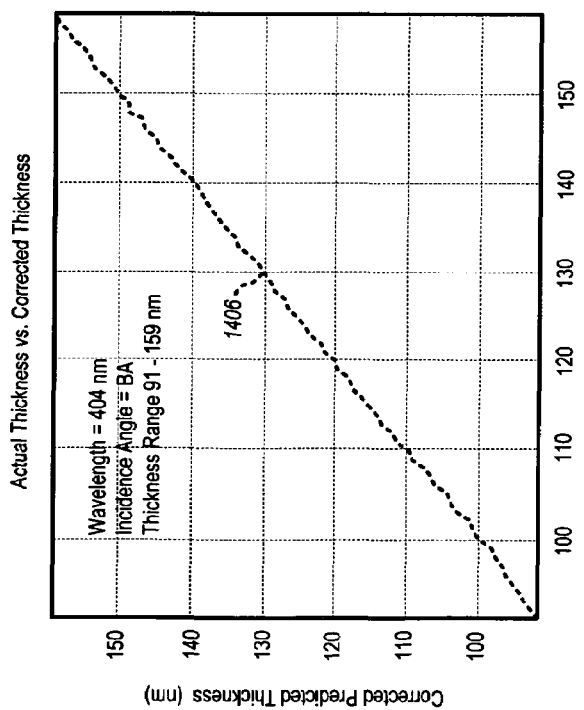

FIG. 13 is a diagram of a multi-layered stack with trenching, similar to those scrutinized in a testing regime by the applicant. Structure 1300 generally comprises photo resist (PR) layer 1314, bottom anti reflection coating (BARC) layer 1316, oxide layer 1318 and silicon substrate 1312. For simulation purposes, structure 1300 is divided into two regions, A and B. Region B represents the portion of structure 1300 in which channel 1320 traverses PR layer 1314 and BARC layer 1316, thereby revealing the surface of oxide layer 1318. Region A is the portion of structure 1300 in which the surface of PR layer 1314 is exposed. The amplitude reflectivity of both regions can be calculated using the characteristic matrix method. Since the present heterodyne reflectometer uses a spatially coherent beam, these reflectivities are added up coherently in order to compute the power reflectance of structure 1300. The thickness of PR layer 1314 was varied from near zero to 2000 Å while the thicknesses of other two layers were kept constant. When the thickness of PR layer 1314 in region A is changed, the depth of trench 1320 in region B is changed correspondingly.

As mentioned above, it is predicted that, in general, a two laser wavelengths (λ) heterodyne reflectometer would be necessary for evaluating a thickness interval of interest when using an incidence angle corresponding to Brewster's angle for the respective wavelength chosen. The laser light sources employed have wavelengths of 632 nm and 404 nm. By carefully selecting the optimal wavelength for the thickness interval of interest, the thickness of the top layer film can be accurately predicted from the phase shift of the beat signal. FIGS. 14A-14D are diagrams depicting the plot of the predicted thickness as a function of input thickness over a thickness interval of 0-2000 Å. As can be gleaned from the diagrams, with the incidence angle set at the Brewster angle for the top film layer, the thickness intervals 0 Å-900 Å and 1600 Å-2000 Å can be accurately predicted using a source having λ=632 nm, but could not accurately predict thicknesses in the range of 910 Å-1590 Å. For that thickness interval, a source having λ=404 nm was employed (see FIG. 14C) for achieving satisfactory thickness measurement accuracies.

Figure 15B:
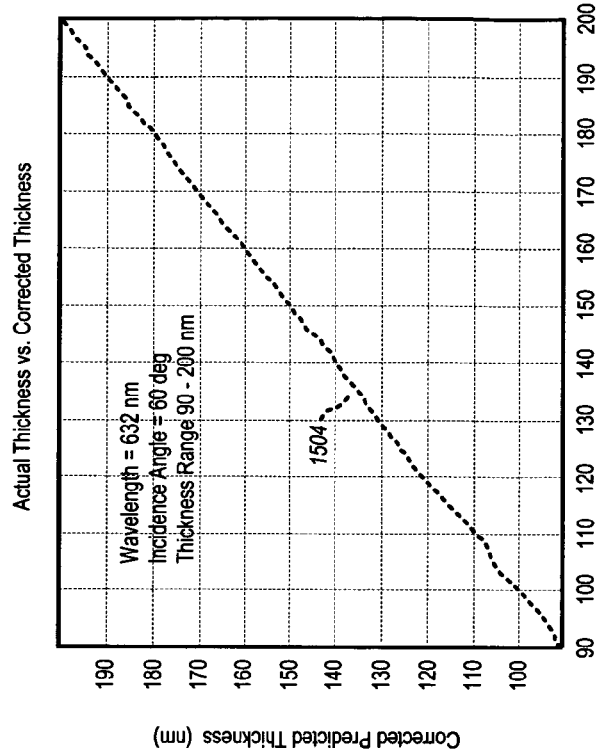
FIGS. 15A-15B are diagrams depicting the plot of the corrected thickness as a function of input thickness for a source wavelength of 632 nm and incident angle incidence angle of 60° for thicknesses over a thickness interval of 0 Å-2000 Å.
Figure 15A:
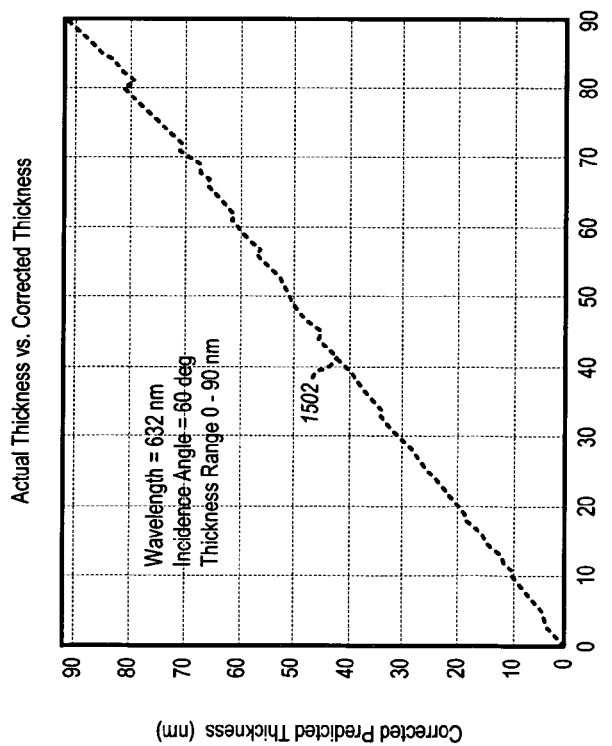

Thus, with Brewster's angle used as the incidence angle, it can be appreciated that two wavelengths might be necessary for accurately predicting the thickness of trenched, multi-stack structures. Two unique wavelengths require two separate error correction solutions, which require four sets of polynomial coefficients to accurately predict thickness. However, further computer experimentation has demonstrated that the incidence could be set at an angle in which the entire thickness range of 0-2000 Å could be predicted using only a single laser wavelength, i.e., the 632 nm. For the film specimens tested, that incidence angle was experimentally determined to be 60° using an optical source having a wavelength of 632 nm (where the Brewster's angle for the top film layer is 57.38° for the source wavelength). Hence, only one algorithm is necessary, having only two sets of polynomial coefficients. The results of the comparison of the predicted thickness and input thickness over a thickness interval of 0 Å-2000 Å can be seen in FIGS. 15A and 15B. Hence, in accordance with exemplary embodiments of the present invention, the incidence angle α is predetermined to be 60°, thus eliminating the necessity for configuring the heterodyne reflectometer for two wavelengths.

The presently described invention provides an uncomplicated mechanism and methodology for accurately determining the thickness of ultra thin films in real time using heterodyned reflectometer. However, as understood in the relevant art, traditional thickness calculations are highly dependent on having an accurate value for the refractive index of the target material. This presents a problem for realizing accurate thicknesses during semiconductor wafer processing because the refractive index of the top layer film often drifts, or changes, as the process progresses, thus injecting an additional error into the thickness calculation.

In accordance with another exemplary embodiment of the present invention, heterodyne reflectometer in conjunction with grating interferometer for simultaneously determining thicknesses and refractive index of thin films. Moreover, thickness calculations are dynamically updated in real time using refractive indexes obtained using information from the grating interferometer. These and other aspects of the invention will be understood from the description of the system and methodology discussed below.

Figure 16:
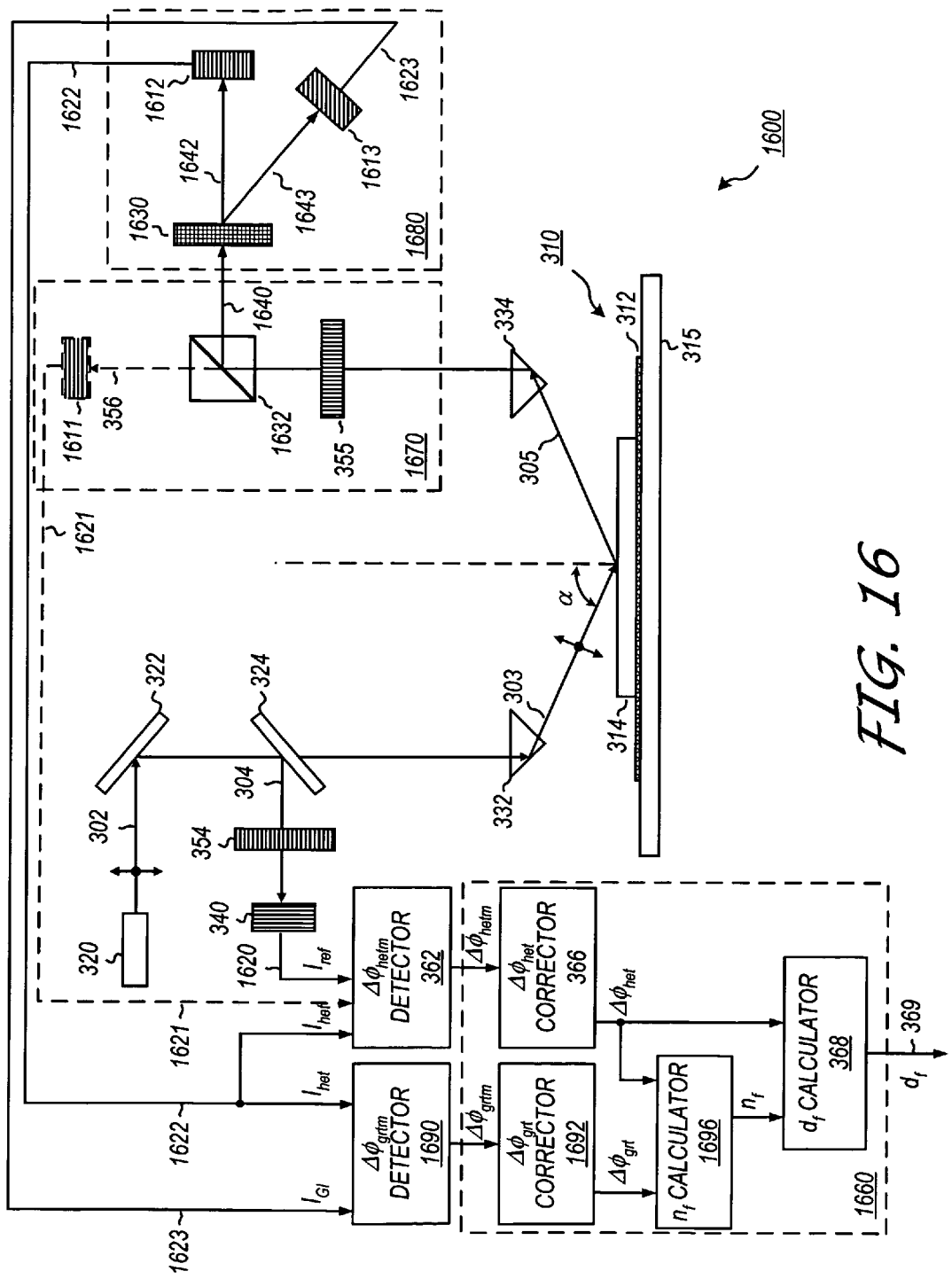
FIG. 16 is a diagram of a combination heterodyne reflectometer and grating interferometer for obtaining error corrected film thicknesses using dynamically updated values for the film's refractive index in accordance with an exemplary embodiment of the present invention.

FIG. 16 is a diagram of a combination heterodyne reflectometer and grating interferometer for obtaining error corrected film thicknesses using dynamically updated values for the film's refractive index in accordance with an exemplary embodiment of the present invention. Heterodyne reflectometer/grating interferometer system 1600 (HR/GI 1600) is similar in many aspects to heterodyne reflectometer system 300 discussed above with regard to FIG. 3A and, therefore, only the distinctions between the two embodiments will be discussed in detail. One distinction apparent from the illustration is that HR/GI 1600 has been further subdivided into heterodyne reflectometer subsection 1670, having detector 1611, and grating interferometer subsection 1680, have zeroth-order beam detector 1612 and first-order beam detector 1623. Heterodyne reflectometer subsection 1670 functions identically to that described above, with detector 1611 producing measurement signal $I_{het}$ and detector 1610 producing reference signal $I_{ref}$ (detectors 1610 and 1611 correlate to detectors 340 and 350, as do signals 1620 and 342, and signals 1621 and 352). Measurement signal $I_{het}$ and reference signals $I_{ref}$ are graphically depicted as signal plots 1802 and 1804, respectively, in FIG. 18, along with the heterodyne phase shift $\Delta\phi_{het}$. Measured heterodyne phase shift $\Delta\phi_m$ is detected by $\Delta\phi_m$ detector 362 as discussed above, but referred to as "$\Delta\phi_{hetm}$" for clarity as a measured grating phase shift, $\Delta\phi_{grtm}$, will also be discussed.

Figure 17A:
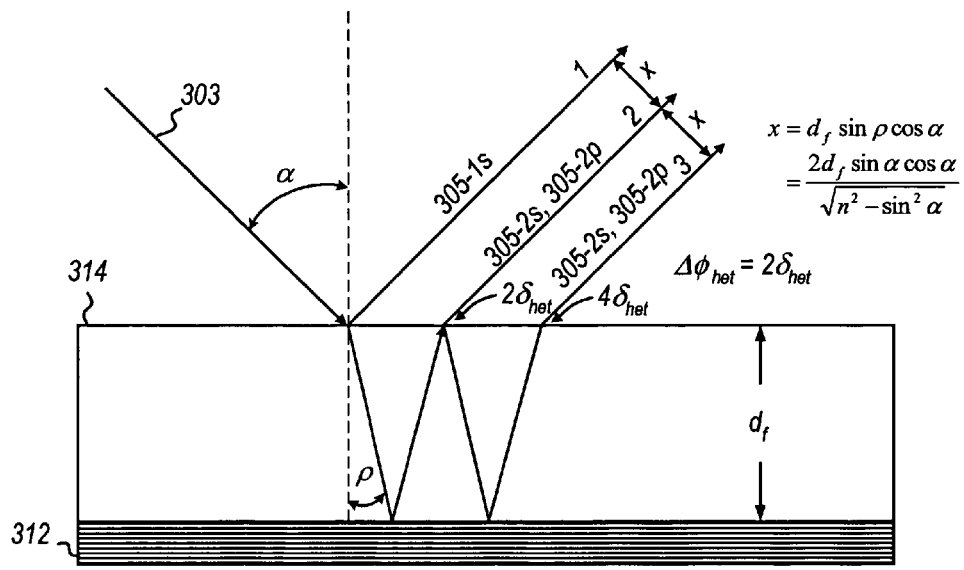
FIGS. 17A and 17B are diagrams depicting the principle of the operation for a grating showing that at least a portion of the detected light beam may be phase shifted from the both the reference signal and the measurement signal.
Figure 17B:
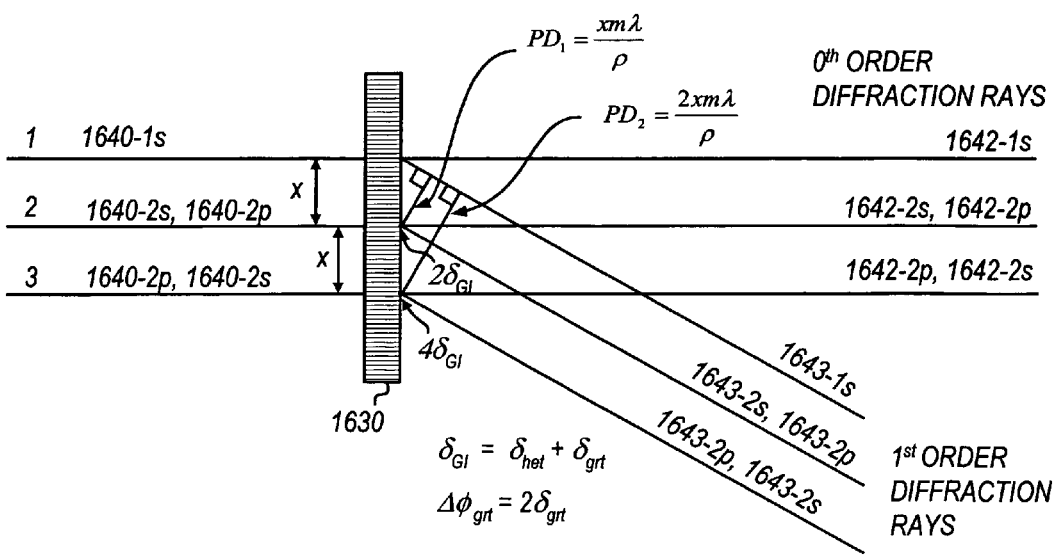

Grating interferometer subsection 1680, on the other hand, utilizes grating 1630, having pitch "p", for diffracting beam 1640 into a plurality of diffraction bands, a bright central band (zeroth-order ray 1642), flanked by several higher-order (first-, second-, third-, and so on, order diffraction bands), of which only first-order ray 1643 is used. The pitch of the grating is essentially based on satisfying three requirements: the Bragg diffraction condition for the chosen wavelength, λ; the dynamic range for the thickness measurement; and the grating interferometer resolution. Turning briefly to FIGS. 17A and 17B, the principle of the operation for grating 1630 can be seen, from whence it can be appreciated that at least a portion of the diffracted light beam will be phase shifted from the reference signal by an additional amount, i.e., by two separate phase shifts. The s-polarization component is depicted in these illustrations as being separated from the p-polarization component for clarity. The first phase shift results from the interaction with film 314 as thoroughly discussed above. Incident beam 303 is split into reflected ray 305-1s and refracted rays 305-2s and 305-2p, reflected by the substrate with each of the refracted rays and the reflected ray separate from one another by a perpendicular distance, x, where:

$$x = 2d_f \tan\rho \cdot \cos\alpha = \frac{2d_f \sin\alpha \cdot \cos\alpha}{\sqrt{n_f^2 - \sin^2\alpha}} \quad (12)$$

x is perpendicular distance between adjacent rays;
$d_f$ is the film thickness;
ρ is the angle of refraction in the film;
α is the angle of incidence; and
$n_f$ is the refractive index of the film.

The second phase shift occurs on only the diffracted light band, ray 1643, from diffraction grating 1630, and consequently is observed on only the first-order diffraction band (comprising diffracted rays 1643-1s, 1643-2s and 1643-2p). There, the first-order rays generated by the diffraction grating 1630, rays 1643-1s, 1643-2s and 1643-2p, upon coherent addition exhibit a grating induced phase shift, $\delta_{grt}$, that corresponds to a path difference, PD, defined as:

$$PD = \frac{mx\lambda}{\rho} \quad (13)$$

PD is perpendicular distance between adjacent first order diffraction rays;

m is an integer constant for the diffraction band, where for the first order band m=1;

$\lambda$ s wavelength of the heterodyne illumination source; and $\rho$ is the angle of refraction in the film.

Since the zeroth-band beam 1642 is not diffracted, but passes unaltered directly through diffraction grating 1630, the grating induced phase shift, $\delta_{grt}$, from interaction with grating 1630, is seen on only first order rays 1643-1s, 1643-2s, and 1643-2p (recall that because incident angle $\alpha$ is selected near Brewster's angle (default incident angle $\alpha=60°$), reflected ray 305-1p is absent, i.e., 1640-1p after BS 1632, since $r_{1p}(\omega+\Delta\omega))\approx0$). As also mentioned above, the phase shift attributed to the film is $2\delta_{het}$ on rays 305-2s and 305-2p. Therefore, the total phase shift at the grating, $\delta_{GI}$, on first order refracted on rays 1643-2s and 1643-2p is $2\delta_{GI}$ where $\delta_{GI}=\delta_{het}+\delta_{grt}$.

Returning to FIG. 16, grating interferometer subsection 1680 utilizes detectors 1612 and 1613 for producing two separate signals for the zeroth-order diffraction beam and the first-order diffraction beam, respectively. Since zeroth-order rays 1642 from grating 1630 are not diffracted, their phase is not changed by grating 1630. Thus, detector 1612 produces a heterodyne measurement signal $I_{het}$ 1622 and the phase shift to measurement signal $I_{het}$ remains at essentially $\Delta\phi_{het}$, with respect to reference signal $I_{ref}$ from detector 1610. Therefore, as a practical matter, path 356 and detector 1611 can be omitted, as can BS 1632. Conversely, first-order rays 1643 from grating 1630 are diffracted, resulting in an additional phase shift from the grating, $\delta_{grt}$, due to the Fourier shift theorem. Detector 1613 produces grating signal $I_{GI}$ 1623 from the first-order beam 1643. A measured grating phase shift, $\Delta\phi_{GIm}$, may be detected from signals $I_{het}$ and $I_{GI}$ in an identical manner to detecting of $\Delta\phi_{hetm}$ from signals $I_{het}$ and $I_{ref}$. Measured phase shift $\Delta\phi_{hetm}$ between the signals $I_{het}$ and $I_{ref}$, as was discussed above, provides information about the optical thickness of the film. Grating phase shift $\Delta\phi_{grtm}$ between the signals $I_{GI}$ and $I_{het}$, on the other hand, provides additional information that is useful in determining the refractive index of the film, $n_f$. Therefore, it is possible to obtain the film's refractive index, $n_f$ from signals $I_{ref}$, $I_{het}$ and $I_{GI}$.

$\Delta\phi_{hetm}$ detector 362 receives reference signal $I_{ref}$ 1620 and either of measurement signals $I_{het}$ 1621 or 1622 from the respective detectors and detects/measures the phase shift, $\Delta\phi_{hetm}$, between the two. As discussed elsewhere above, measured phase shift $\Delta\phi_{hetm}$ should be error corrected prior to making thickness calculations by using, for example, the polynomial function. Therefore, $\Delta\phi_{het}$ corrector 366 receives measured phase shift values, $\Delta\phi_{hetm}$, from $\Delta\phi_{hetm}$ detector 362 and applies the error correction algorithm. Corrected phase shift $\Delta\phi_{het}$ is then passed to $d_f$ calculator 368, but is also passed to $n_f$ calculator 1696, for reasons discussed immediately below.

Figure 19:
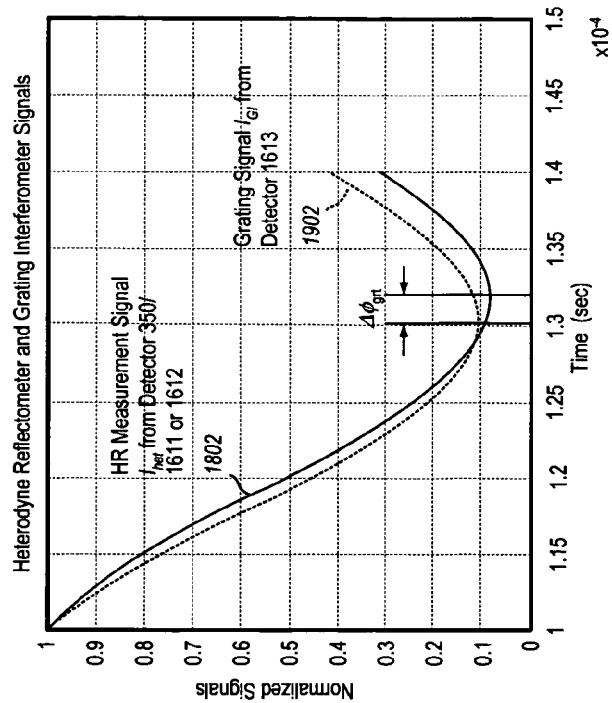
FIG. 19 is a diagram showing the relationship between the measurement signal $I_{het}$ and grating signal $I_{GI}$ with the grating phase shift $\Delta\phi_{grt}$.

$\Delta\phi_{grtm}$ detector 1690 receives grating signal $I_{GI}$ 1623 and either of measurement signals $I_{het}$ 1621 or 1622 from the respective detectors and detects/measures the phase shift induced on grating signal $I_{GI}$ 1623 by the grating alone, i.e., $\Delta\phi_{grtm}$ is detected between grating signal $I_{GI}$ 1623 and either of measurement signals $I_{het}$ 1621 or 1622. Measurement signal $I_{het}$ and grating signals $I_{GI}$ are graphically depicted as signal plots 1802 and 1902, respectively, in FIG. 19 along with the heterodyne phase shift $\Delta\phi_{grt}$.

One feature of the present invention is its ability to dynamically update the thickness computation with updated and corrected values for the film's refractive index in real time. Therefore, extremely accurate film thicknesses are attainable in production processes, which are independent of changes in the film's refractance. Changes in the refractive index can be due to a change in the refractive index $n_f$, from the process itself e.g., nitridation of $SiO_2$ to form High-k SiON in the gate process.

The refractive index for the film being examined can be determined from phase shift $\Delta\phi_{het}$ and phase shift $\Delta\phi_{grtm}$. However, similar to the measured heterodyne phase shift $\Delta\phi_{hetm}$, the measured grating phase shift $\Delta\phi_{grtm}$ detected by $\Delta\phi_{grtm}$ detector 1690 has an inherent error that must be corrected prior to making the index calculations. Corrected grating phase shift $\Delta\phi_{grt}$ is then sent to $n_f$ calculator 1696. $n_f$ calculator 1696 utilizes a separate function for determining $n_f$ (such as Equation (22) below), which is then sent to $d_f$ calculator 368. The film thickness calculation, for example Equation (10) above employed by $d_f$ calculator 368 makes use of $n_f$ for calculating film thickness $d_f$.

The set-up is configured to have incidence angle $\alpha$, near Brewster's angle ($\alpha=60°$). At this angle, there is minimal or no reflection of the p- polarized light from the top surface of the film. That enables measurement signal $I_{het}$ 1621 from detector 1611 to be rich with film-thickness information. For a thin film on Si substrate, measurement signal $I_{het}$ from detector 1611 can be expressed as:

$$R_{het} \propto \frac{r_{1s}^2 + r_{2s}^2 + 2r_{1s}r_{2s}\cos 2\delta_{het}}{1 + r_{1s}^2 r_{2s}^2 + 2r_{1s}r_{2s}\cos 2\delta_{het}} + \frac{r_{2p}^2}{1} + \quad (14)$$

$$\frac{2f\cos(\Delta\omega t)}{1 + a^2 + 2a\cos 2\delta_{het}} + \frac{2[c + af]\cos(\Delta\omega t + 2\delta_{het})}{1 + a^2 + 2a\cos 2\delta_{het}} +$$

$$\frac{2ac\cos(\Delta\omega t + 4\delta_{het})}{1 + a^2 + 2a\cos 2\delta_{het}}$$

Where $a = r_{1s}r_{2s}$, $b = r_{1p}$, $r_{2p}$, $c = r_{1s}r_{2p}$, $d = r_{1p}r_{2s}$, $f = r_{2s}r_{2p}$, $g = r_{1s}r_{1p}$ and $$\delta_{het} = \frac{2\pi}{\lambda}\sqrt{n^2 - \sin^2\alpha} \times d$$

is the phase that needs to be measured in order to compute the film thickness. It is ~25 mrad for 1 nm SiON film. In Equation (14), the heterodyne terms with phase information is due to coherent addition of terms that involve $r_{1s}(\omega)$ and $r_{2p}(\omega+\Delta\omega)$. Extraction of film thickness information from Equation (18) is explained elsewhere.

The purpose of the grating interferometer is to provide an alternate approach to measuring phase/thickness of the film. By combining this measurement with that from the heterodyne reflectometer, the refractive index of the film can be determined. Following the analysis of the heterodyne reflectometer, the following equations can be understood for the first-order beam from the grating interferometer. For a single film stack, the s-polarization reflectance can be described with the following equation:

$$r_s = \frac{r_{1s} + r_{2s}e^{-i2\delta_{GI}}}{1 + r_{1s}r_{2s}e^{-i2\delta_{GI}}} \quad (15)$$

The p-polarization reflectance as equation:

$$r_p = \frac{r_{1p} + r_{2p}e^{-i2\delta_{GI}}}{1 + r_{1p}r_{2p}e^{-i2\delta_{GI}}} \quad (16)$$

where $$\delta_{GI} = \left[\frac{2\pi}{\lambda}\sqrt{n^2 - \sin^2\alpha} \times d + \frac{2\pi}{p}\frac{(\pm m)\times\sin\alpha\times\cos\alpha}{\sqrt{n^2 - \sin^2\alpha}} \times d\right].$$

That is $\delta_{GI} = \delta_{het} + \delta_{grt}$ and m=1 for first-order beam.

When the two polarizations are mixed, the resultant amplitude-reflectance sensed by the detector can be written as:

$$r_{GI} = (r_s e^{i\omega t} + r_p e^{i(\omega+\Delta\omega)t}) \times \cos 45° \quad (17)$$

It follows that the power reflectance can be expressed as:

$$R_{GI} = r_{eff} \times r_{eff}^* \times (\cos 45°)^2 \quad (18)$$

After substituting equations (15), (16), and (17) in equation (18), $R_{GI}$ at Brewster's angle can be expressed as:

$$R_{GI} \propto \begin{bmatrix} r_{1s}^2 + r_{2s}^2 + \\ \frac{2r_{1s}r_{2s}\cos 2\delta_{GI}}{1 + r_{1s}^2 r_{2s}^2 +} + \frac{r_{2p}^2}{1} + \frac{2f\cos(\Delta\omega t)}{1 + a^2 + 2a\cos 2\delta_{GI}} + \\ 2r_{1s}r_{2s}\cos 2\delta_{GI} \\ 2[c + \\ \frac{af]\cos(\Delta\omega t + 2\delta_{GI})}{1 + a^2 + 2a\cos 2\delta_{GI}} + \frac{2a\cos(\Delta\omega t + 4\delta_{GI})}{1 + a^2 + 2a\cos 2\delta_{GI}} \end{bmatrix} \times DE \quad (19)$$

DE is the grating's first-order diffraction efficiency.

Equation (14) is representative of measurement signals $I_{het}$ from detectors 1611 or 1612. In grating interferometer 1680, by monitoring the zero crossing of measurement signals 1622, $I_{het}$, and grating signal 1623, $I_{GI}$, the grating induced phase shift $\delta_{grt}$ can be determined. The grating induced phase shift $\delta_{grt}$ can also be detected by other well known phase measuring technique.

By comparing the zero crossing of reference signal 1620, $I_{ref}$, and measurement signals 1621 or 1622, $I_{het}$, the phase shift, $\Delta\phi_{het}$, induced by ultra thin films can be determined. The heterodyne phase shift $\Delta\phi_{het}$ can also be detected by other well known phase measuring techniques. This heterodyne phase shift can be represented is:

$$\Delta\phi_{het} = \frac{2\pi \times \sqrt{n^2 - \sin^2\alpha} \times 2d}{\lambda} = 2 \times \delta_{het} \quad (20)$$

From the measurement signals 1621 or 1622, $I_{het}$, and the grating signal 1623, $I_{GI}$, the grating induced phase shift, $\Delta\phi_{grt}$, can be determined, which is independent of $\Delta\phi_{het}$. The grating phase shift can be represented as:

$$\Delta\phi_{grt} = \frac{2\pi \times \sin\alpha \times \cos\alpha \times 2d}{p\sqrt{n^2 - \sin^2\alpha}} = 2 \times \delta_{grt} \quad (21)$$

By dividing Equation (20) by Equation (21) and after some simple algebra, the refractive index, n, can be expressed as:

$$n = \sqrt{\sin^2\alpha + \left(\frac{\Delta\phi_{het}}{\Delta\phi_{grt}}\right)\frac{\lambda}{p}\sin\alpha \times \cos\alpha} \quad (22)$$

Figure 20:
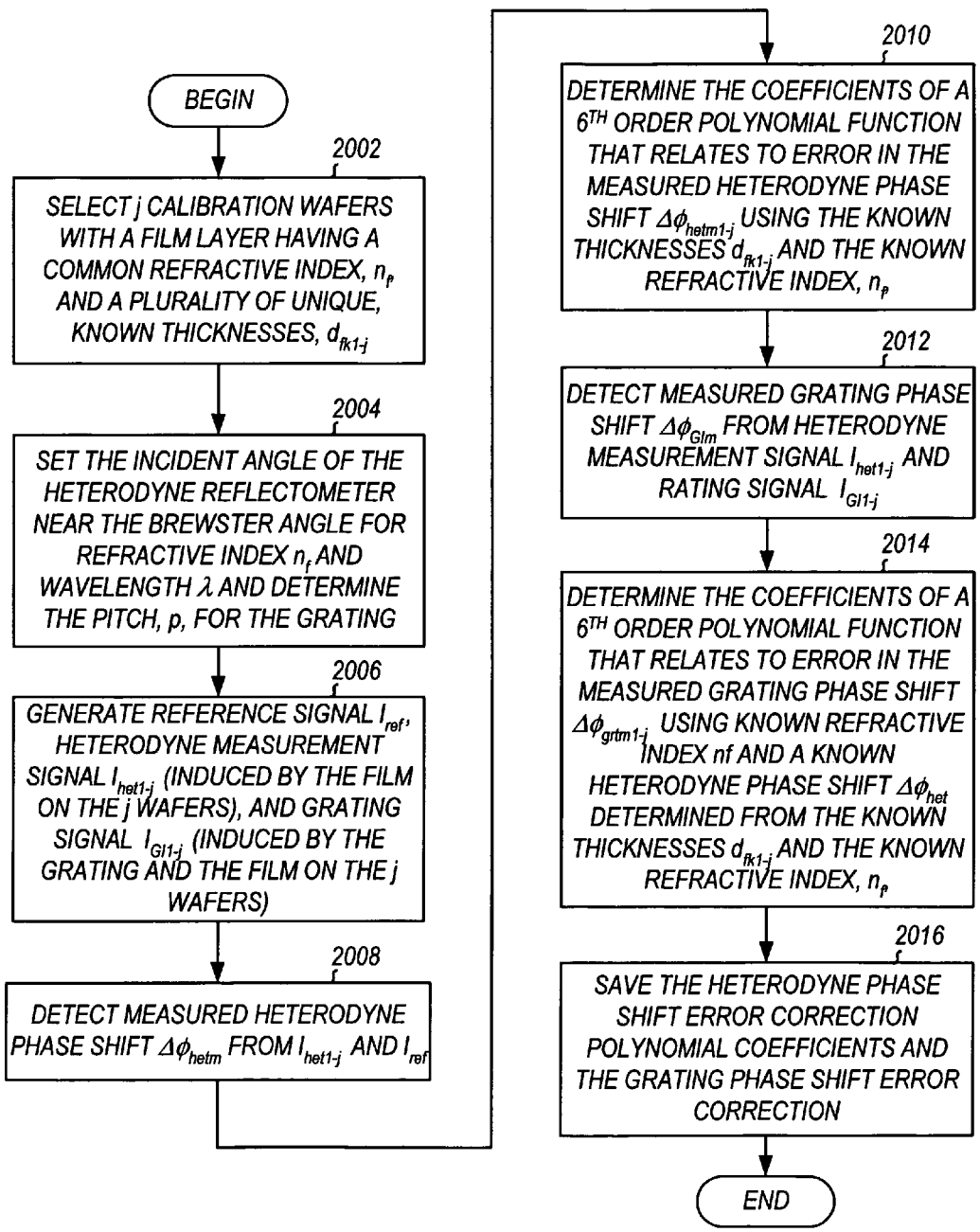
FIG. 20 is a flowchart depicting a process for simultaneously determining a heterodyne phase shift correction algorithm for correcting heterodyne phase shift measurements and a grating phase shift correction algorithm for correcting grating phase shift measurements in accordance with an exemplary embodiment of the present invention.

The refractive index calculation requires accurate heterodyne phase shift information $\Delta\phi_{het}$, as well as accurate grating phase shift information, $\Delta\phi_{grt}$, therefore, correction algorithms should be derived for correcting the measured values of each. The process for obtaining a heterodyne phase shift correction algorithm from calibration wafers with known film thickness and a known diffraction index has been discussed above with regard to the flowchart illustrated on FIG. 11. The process for deriving a grating phase shift correction algorithm from calibration wafers with known film thickness and a known diffraction index for a grating having pitch p is depicted in FIG. 20 as a simultaneous process for obtaining a phase shift correction algorithm.

Accordingly, the process begins by selecting a number of calibration wafers having a single known refractive index $n_f$ and a plurality of known thicknesses $d_{fk1-j}$ (step 2002). The heterodyne reflectometer system is adjusted, if possible, for an incident angle α based on known refractive index $n_{fk}$ of the calibration film and heterodyne source wavelength λ (step 2004). Alternatively, incident angle α may be set to a predetermined default, e.g., α=60°. At this point, the pitch, p, of the grating is also noted.

In operation, the split frequency polarized beam is reflected off the film in the heterodyne reflectometer system, resulting in the generation of a heterodyne measurement signal $I_{het}$ and grating signal $I_{GI}$, for each of the j wafers (step 2006). These signals are used with the known film parameters of the calibration wafers for determining a set of correction coefficients for a polynomial function for the measured heterodyne phase shift, $\Delta\phi_{hetm}$, and another set of correction coefficients for a polynomial function for the measured grating phase shift, $\Delta\phi_{grtm}$. Measured heterodyne phase shift $\Delta\phi_{hetm}$ is detected from reference signal $I_{ref}$ and measurement signal $I_{het}$ for each of the j calibration wafers (step 2008) and is then used in the determination of coefficients for a sixth-order polynomial function that relates to error in the measured phase shift $\Delta\phi_{m1-j}$ (step 2010). In a similar manner, measured grating phase shift $\Delta\phi_{grtm}$ is detected from measurement signal $I_{het}$ and grating signal $I_{GI}$, for each of the j calibration wafers (step 2012). The actual grating phase shift $\Delta\phi_{grtk1-j}$ can then be calculated from known refractive index $n_f$ and plurality of known film thicknesses $d_{fk1-j}$ (as shown in Equation (21) above), which is then used for deriving a set of coefficients for a sixth-order polynomial function that relates to error in the measured phase shift $\Delta\phi_{grtm1-j}$ (step 2014). Importantly, corrected grating phase shift $\Delta\phi_{grt}$ and corrected heterodyne phase shift $\Delta\phi_{het}$ will be used for finding film refractive index $n_f$ (for example using Equation (22) above). The film thickness calculation can then be dynamically updated with refractive index $n_f$ from the corrected phase shifts. Thus, the set of correction coefficients, with the polynomial function for correcting the measured heterodyne phase shift, $\Delta\phi_{hetm}$, and second set of correction coefficients, with the polynomial function for correcting the measured grating phase shift, $\Delta\phi_{G_{lm}}$ are saved with the reference refractive index of the calibration wafer and the configuration parameters.

The present invention facilitates the computation of highly accurate film thicknesses on the fly through the use of an error correcting thickness equation, which is dynamically updated for changes in the refractive index of the film layer. Thus, changes in the refractive index during wafer processing will not affect the accuracy of the film thickness results. One exemplary method for dynamically updating the index during thickness calculating is present below.

Figure 21A:
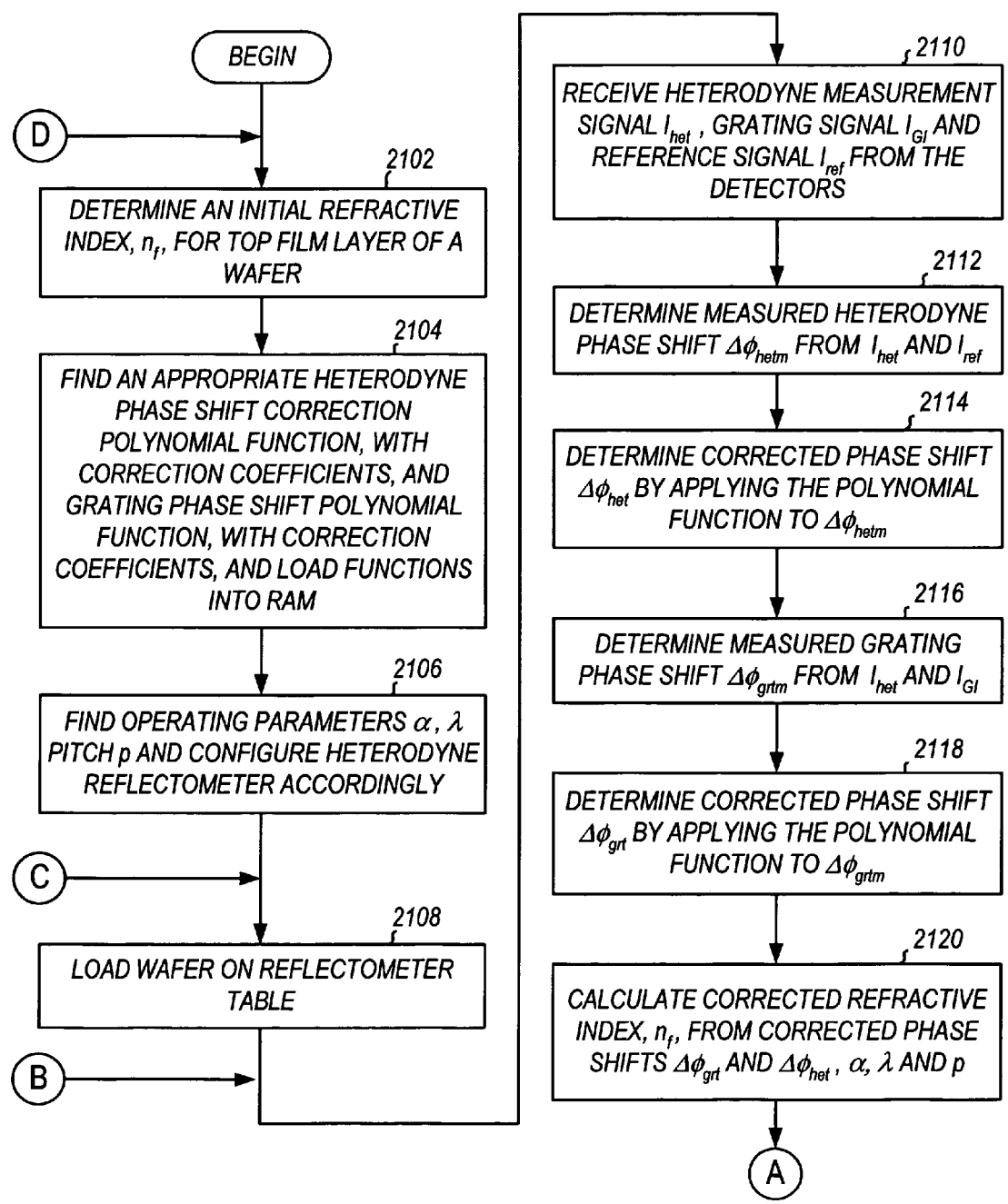
FIGS. 21A and 21B are a flowchart of a process for obtaining corrected film thicknesses from heterodyne reflectometer signals in which the refractive index component of the thickness calculation is dynamically updated in accordance with an exemplary embodiment of the present invention.
Figure 21B:
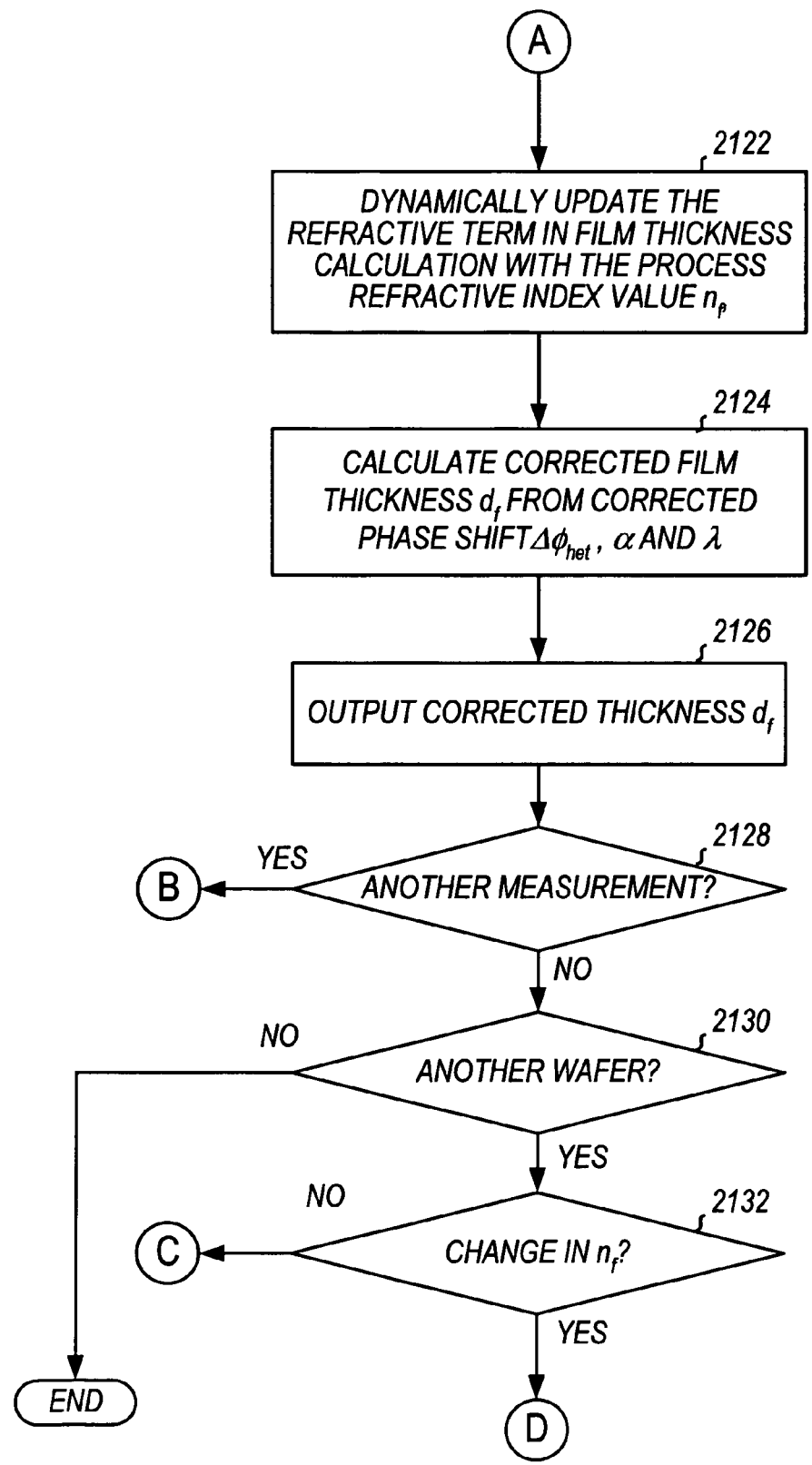

FIGS. 21A and 21B are a flowchart of a process for obtaining corrected film thicknesses from heterodyne reflectometer signals in which the refractive index component of the thickness calculation is dynamically updated in accordance with an exemplary embodiment of the present invention. The process begins by determining initial refractive index $n_f$ for the top film layer of wafer, e.g., a production wafer (step 2102). Using the index, two appropriate polynomial function are indented for correcting error in the measured signals and loaded into system RAM (step 2104). A first polynomial function, with an appropriate set of correction coefficients, is identified for correcting the error in measured heterodyne phase shift $\Delta\phi_{hetm}$. A second polynomial function, with an appropriate set of correction coefficients, is identified for correcting the error in measured grating phase shift, $\Delta\phi_{grtm}$. The heterodyne correction coefficients for the polynomial function for measured heterodyne phase shift $\Delta\phi_{hetm}$ is used for determining a corrected heterodyne phase shift, $\Delta\phi_{het}$, from the measured heterodyne phase shift, $\Delta\phi_{hetm}$, which then can be used for generating accurate film thicknesses. Conversely, the grating correction coefficients for the polynomial function for measured grating phase shift error is used for determining a corrected grating phase shift, $\Delta\phi_{grt}$, from the measured grating phase shift, $\Delta\phi_{grtm}$, which then can be used in conjunction with corrected heterodyne phase shift $\Delta\phi_{het}$ for generating an accurate refractive index, $n_f$, for the film. Since the accuracy of the thickness calculation is dependent on the accuracy of the refractive index, this new refractive index is used for dynamically updating the refractive index term of the film thickness computation, for example thickness Equation (10) (step 2106). This step need not be repeated for subsequent wafers in a typical production run since the film refractive index for the individual process wafers usually remains constant. The thickness measurement computation, with a dynamically updated refractive index, can now proceed.

A wafer is loaded onto the reflectometer table (step 2108) and illuminated. A reference beam from the light source, and measurement and grating beams from the film layer are detected and converted to reference signal $I_{ref}$, measured heterodyne signal $I_{het}$ and grating signal $I_{GI}$. Heterodyne measurement signal $I_{het}$ and reference signal $I_{ref}$ are received at the $\Delta\phi_{hetm}$ heterodyne phase shift detector, while, simultaneously, heterodyne measurement signal $I_{het}$ and grating signal $I_{GI}$ are received at the $\Delta\phi_{grtm}$ grating induced phase shift detector (step 2110). The $\Delta\phi_{hetm}$ detector determines $\Delta\phi_{hetm}$ from the $I_{ref}$ and $I_{het}$ signals (step 2112).

The measured heterodyne phase shift $\Delta\phi_{hetm}$ is corrected, using the error correcting polynomial function for $\Delta\phi_{hetm}$, to the actual $\Delta\phi_{het}$ (step 2114). Although error correcting the measured heterodyne phase shift $\Delta\phi_{hetm}$ vastly increases the accuracy of the thickness measurement over the prior art methodology, it is possible to attain even more accuracy by dynamically updating parameters in the film thickness calculation that change, or drift, during processing; the most important of which is the film's refractive index. Thus, in a parallel operation, the $\Delta\phi_{grtm}$ detector determines $\Delta\phi_{grtm}$ from the $I_{het}$ and $I_{GI}$ signals (step 2116). The measured grating phase shift $\Delta\phi_{grtm}$ is then corrected, using the error correcting polynomial function for $\Delta\phi_{grtm}$, to the actual $\Delta\phi_{grtm}$ (step 2118).

By having the actual corrected grating phase shift $\Delta\phi_{grt}$ and corrected heterodyne phase shift $\Delta\phi_{het}$, the process value for the refractive index can be determined using a refractive index calculation, for example Equation (22) (along with other necessary information such as source wavelength information $\lambda$, incidence angle $\alpha$ and pitch p) (step 2120). The updated refractive index $n_f$ can then be used to dynamically update the refractive index parameter in the film thickness computation in real time (step 2120) and film thickness $d_f$ obtained therefrom (using, of course, source wavelength information $\lambda$ and incidence angle $\alpha$) (step 2124). $d_f$ can then be output for use in, for example, an endpoint determination (step 2126).

The flow continually iterates from step 2110 for the current wafer until the process is halted (step 2128), wherein another wafer may be examined for the initial refractive index (steps 2130 and 2132) and the measurement process continues as described above until the final thickness measurement is taken from the last wafer in the run. The process then ends.

In accordance with still another exemplary embodiment of the present invention, measurement signal $I_{het}$ is enhanced by redirecting the reflected beam back to the film target at incidence angle $\alpha$. This double-pass approach has the advantage of superior suppression of the p-polarized light from the film surface of the single-pass approach discussed above.

Figure 22:
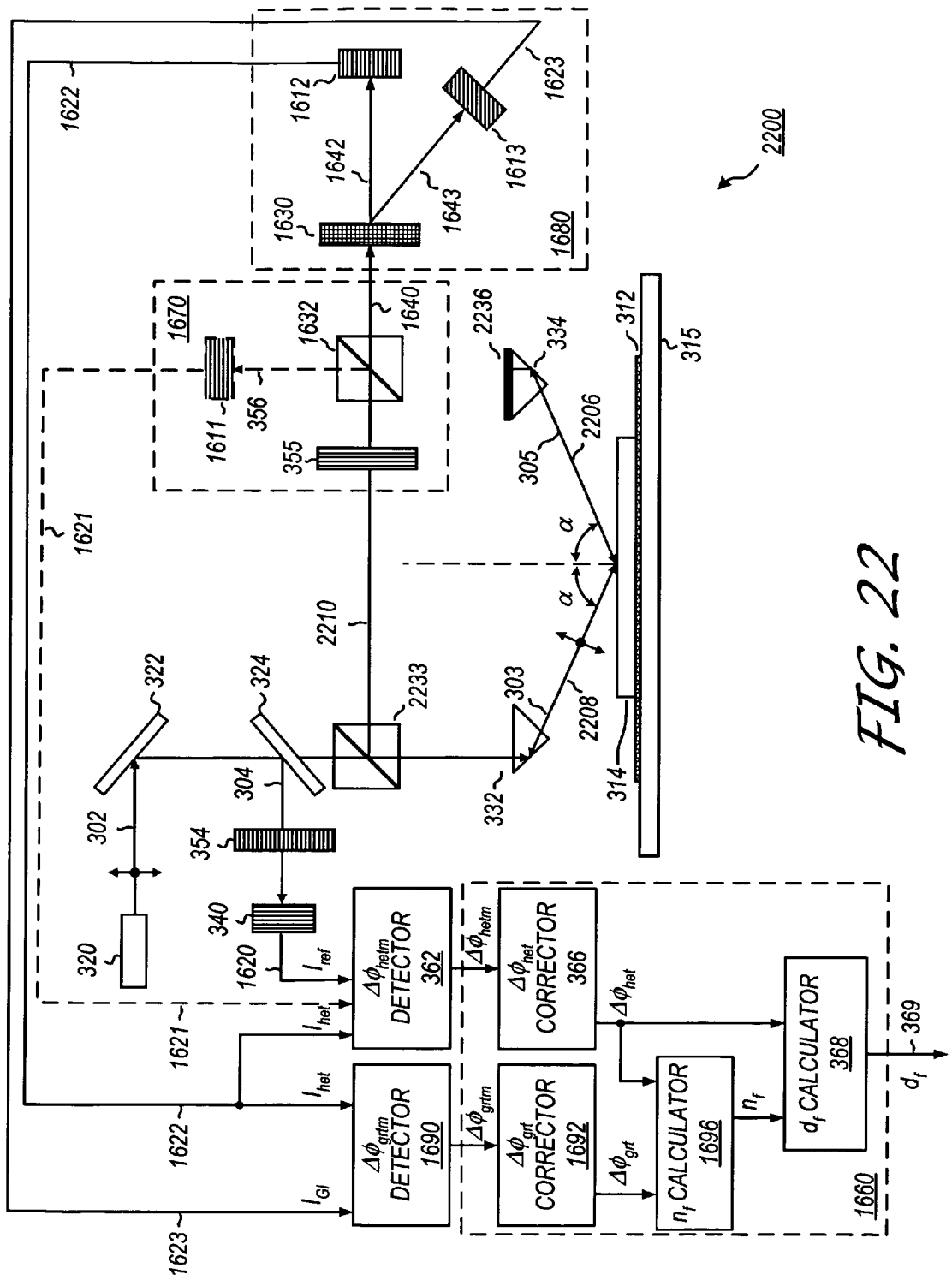
FIG. 22 is a diagram of a heterodyne reflectometer for measuring thin film thicknesses using a double-pass approach in accordance with an exemplary embodiment of the present invention.

FIG. 22 is a diagram of a combination heterodyne reflectometer and grating interferometer which utilizes the double-pass approach by redirecting the reflected beam back to the film target in accordance with an exemplary embodiment of the present invention. Heterodyne reflectometer/grating interferometer system 2200 is similar to heterodyne reflectometer system 300 and combination heterodyne reflectometer and grating interferometer 1600, discussed above with regard to FIG. 3A and FIG. 16, and, therefore, only the aspects related to the double-pass approach will be discussed. However, it should be clear that the double-pass approach offers enhanced measurement sensitivity of the reflectometer in any of the reflectometer embodiments discussed.

Essentially, a double-pass of the measurement beam is achieved by redirecting the beam reflected from the surface of the film, back onto the film at an angle of incidence equal to that of the first pass. For instance, with regard to FIG. 22, incident beam 303 passes through BS 223, redirected at prism 332 and onto target film 314. Reflected beam 305, comprised of spilt frequency s-polarization and p-polarization components, is received at prism 334, which has a HR (high reflection) coating on one face, is reflected back to the target on film 314 as beam 2206. As depicted in this embodiment, beam 2206 essentially retraces the path of beam 305 back to the target at incidence angle $\alpha$. Beam 2206 interacts with film 314 and is reflected back to prism 332 as reflected beam 2208, and then on to BS 2233 where it is redirected onto the heterodyne reflectometer subsection 1670 and/or heterodyne reflectometer grating interferometer subsection 1680. In so doing, the phase shift attributable to the film is effectively doubled, thereby enhancing the measurement sensitivity of the reflectometer by a factor of two. While the presently described embodiment utilizes a coated prism for redirecting the beam path, essentially back on itself, other optical components may be used such as a mirror or a set of optical components for redirecting the beam back to the film in the original plane of incidence defined by the initial pass, or in a plane other than the original plane of incidence. Furthermore, it may be advantageous, in certain situations, to make more that two passes on the film.

Although the path distance for the beam increases, $\Delta d$, due to the change in $\Delta \phi_{hetm}$, which has been effectively doubled, the increase in phase shift will be accommodated in correcting coefficients to the polynomial function.

Figure 23:
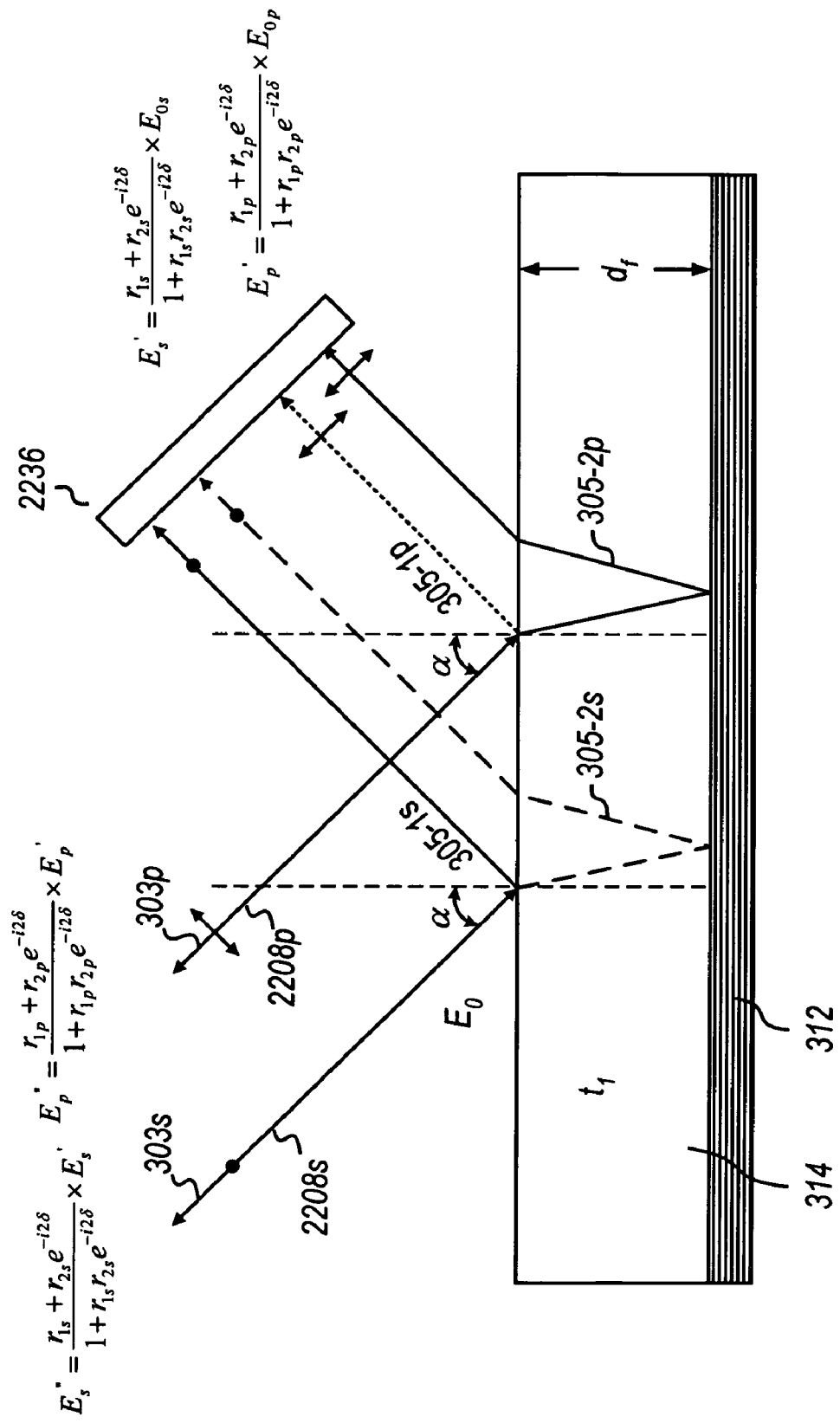
FIG. 23 is a diagram depicting the principle of the operation for the double-pass approach for enhancing sensitivity by increasing phase shift.

An analysis of heterodyne reflectometry of the present embodiment is illustrated in the diagram on FIG. 23. The s-polarization component is depicted as being separated from the p-polarization component for clarity. From the depiction, it can be appreciated that both polarization components undergo double-pass thin film reflectance. For example, s-polarization component 303s interacts with film 314, producing rays 305-1s and 305-2s which are redirected back to the film 314 by mirror 2236. These rays then interact with the film once again, producing double-pass s-polarization component 2208s, which can be detected. p-polarization component 303p follows essentially the identical path, but, as discussed above, interacts differently with film 314 than does the s-polarization component.

For a single film stack, the s-polarization reflectance is $$r_s = \frac{r_{1s} + r_{2s}e^{-i2\delta}}{1 + r_{1s}r_{2s}e^{-i2\delta}} \times \frac{r_{1s} + r_{2s}e^{-i2\delta}}{1 + r_{1s}r_{2s}e^{-i2\delta}} \quad (23)$$

and the p- polarization reflectance is $$r_p = \frac{r_{1p} + r_{2p}e^{-i2\delta}}{1 + r_{1p}r_{2p}e^{-i2\delta}} \times \frac{r_{1p} + r_{2p}e^{-i2\delta}}{1 + r_{1p}r_{2p}e^{-i2\delta}} \quad (24)$$

where $$\delta = \frac{2\pi}{\lambda}\sqrt{n^2 - \sin^2\alpha} \times d$$

and $\alpha$ is the angle of incidence.

When the two polarizations are mixed, the resultant amplitude-reflectance sensed by the detector can be written as $$r_{eff} = (r_s e^{i\omega t} + r_p e^{i(\omega + \Delta\omega)t}) \times \cos 45° \quad (25)$$

$$R_{eff} = r_{eff} \times r_{eff}^* \times (\cos 45°)^2 \quad (26)$$

The cos 45° represents the mixing of the two polarizations at the detector. Algebraic manipulation of Equation (4) is unwieldy by hand, producing 324 numerator terms and 81 denominator terms, therefore the equation was modeled. A plot of a comparison between the single-pass approach and the double-pass approach is shown in FIG. 24. From that diagram, the sensitivity difference between the standard single-pass heterodyne reflectometry (the difference between reference plot 2402 and single-pass plot 2404) and the higher sensitivity double-pass heterodyne reflectometry (the difference between reference plot 2402 and double-pass plot 2406), can be appreciated. As expected, for a given film thickness, the phase shift sensed by the double-pass heterodyne reflectometry is double that of single-pass heterodyne reflectometry. This means that a 0.7 Å resolution (in case of SiON film with 10% nitridation) can be obtained with a detector capable of resolving 0.2°. This is within the capability of off-the-shelf electronics (e.g., vector voltmeter).

While the double-pass approach offers better suppression of the p-polarized light from the film surface, there is also some corresponding reduction in the intensity of s-polarized light as well. This leads to some reduction in fringe contrast as was indicated in the simulation. The present analysis assumes that the "standing wave" created inside the film will not contribute to any index difference at the nodes and anti-nodes. Considering the wavelengths utilized herein and the power level in the heterodyne reflectometer, it is a reasonable assumption.

Turning once more to the diagrams of the exemplary embodiments of the present reflectometer, FIGS. 3A, 16 and 22, it is important to understand that the accuracy of the thickness measurements depends to a large extent of the accuracy of the measured phase shift detected at phase shift detectors 362 and 1690. The operation of these components will be described. Because the operation of the exemplary embodiments of the phase shift detectors of the present invention are applicable to either the heterodyne phase shift detector (for finding the phase difference between $I_{het}$ and $I_{ref}$) or grating phase shift detector (for finding the phase difference between $I_{het}$ and $I_{GI}$), the signals will be referred to generically.

However, before the phase difference can be accurately determined between the signals, the signal should be converted to a better form for making phase comparisons. This is accomplished using Equation (1) as the basis for a "fit function" for converting the signals.

FIG. 25 is a flowchart depicting a process for determining a phase difference between two signals in accordance with an exemplary embodiment of the present invention. This method is useful for computing $\Delta\phi_{hetm}$ and/or $\Delta\phi_{grtm}$ from their respective signals. Initially, the signal data should be preprocessed for eliminating parameters in the fit function, such as the DC component parameter. This is accomplished by mean-centered the data signals and then normalized the amplitudes to a highest amplitude value for each (step 2502). Next, the reference data is fit to the fit function: $I_r = B_r \cos(\Delta\omega_r t + \phi_r)$ (step 2504), where $B_r$ is the reference signal amplitude;

$\phi_r$ is being phase difference between the two heterodyne signals; and $\Delta\omega_r$ is the angular frequency difference between the two heterodyne signals.

After which the sample data is fit to a similar fit function: $I_s = B_s \cos(\Delta\omega_s t + \phi_s)$ (step 2506), where $B_s$ is the sample signal amplitude;

$\phi_s$ is phase difference between the two heterodyne signals; and $\Delta\omega_s$ is the angular frequency difference between the two heterodyne signals.

With the reference and sample data fitted to similar fit functions, the phase angle between the two signals are detected as $\Delta\phi = \phi_s - \phi_r$ (step 2508). Various means for detecting Δφ are present immediately below, the components of which are represented diagrammatically in FIGS. 26A-26D, where appropriate.

In accordance with one exemplary embodiment, the phase angle between the reference and sample data can be determined by the application of the cross correlation method to the two signals. Using this option, a cross correlation function is first applied to the two data series (e.g., xcorr (data1,data2) represented in a high-level technical computing language for algorithm development and data visualization such as MatLab, which is a registered trademark of, and available from The MathWorks, Inc., Natick, Mass.). Next, find the delay where the cross correlation has a maximum value. Finally, the phase shift between reference and sample signals is determined from the ratio of the delay to the number of data points in a beat cycle (i.e., delay/(digitization rate×beat frequency)).

More specifically, the cross correlation procedure is a method of estimating the degree to which two series are correlated. Mathematically the procedure is defined as follows:

$$r = \frac{\sum_i [(x(i)-mx)*(y(i-d)-my)]}{\sqrt{\sum_i (x(i)-mx)^2}\sqrt{\sum_1 (y(i-d)-my)^2}}$$

wherein x(i) and y(i) where i=0, 1, 2 ... (N−1) denote the two series being analyzed and d is the delay at which the cross correlation is evaluated. The values mx and my are the means of the corresponding series. The cross correlation is generally expressed as r(d).

Essentially, digitized data for the reference and sample signals is collected with the ratio of the digitization rate to beat frequency, Δω, determines the resolution of the phase angle, therefore the data must be digitized at a rate greater than the desired phase angle resolution. The length of the collected data (N number of samples) must be long enough to permit noise reduction techniques to be applied. In the absence of drift in the system, longer collection times are preferred.

Next, the cross correlation function is applied to the two data series. An exemplary code for the cross correlation computation is presented below:

[c,lags]=xcorr(data(:,1),data(:,2));

Next, the select the delay at which the cross correlation has a maximum value. The maximum value of the cross correlation function is computed by the following exemplary code:

[Y,I]=max(abs(c));

maxlags=lags(I)

Finally, the delay value is converted to a phase lag value by ratioing the lag value to the ratio of the digitization rate to beat frequency yields the fractional phase, which can be converted to degrees.

In practice, the procedure listed above should be performed twice. The first time as a null measurement with no sample installed to remove any systematic phase shift due to the optical components or electronics. The second time the sample is installed and the phase shift will be directly determined for the sample film.

Alternatively, and as depicted in FIG. 26A, the reference RF1 and the sample RF2 signals can be sent to time interval counter 2602 where the time between two reference points in the signals (between START T1 and STOP T2), such as the zero crossing, is measured. The periods of the signals are also measured. The relation of the time difference to the period yields the phase shift.

In accordance with still another approach for determining the phase shift between reference and sample signal trains, depicted in FIG. 26B, signals RF1 and RF2 are sent to mixer 2612 where the sum and difference frequencies are created. Since signals RF1 and RF2 have the same frequency, the difference frequency is a voltage, which is proportional to the phase difference. Optionally, phase shifter 2610 may also be included for setting the signals to have the same initial phase at mixer 2612 so that later measurements of the phase change can be done without an offset, as may low-pass filter 2614 at the output for reducing noise.

In a modification of the approach, depicted in FIG. 26C, the output is fed back through amplifier 2616 to phase shifter 2610 to keep the phases locked at mixer 2612. Here the signal is the feedback signal, which is proportional to the phase difference.

Figure 27:
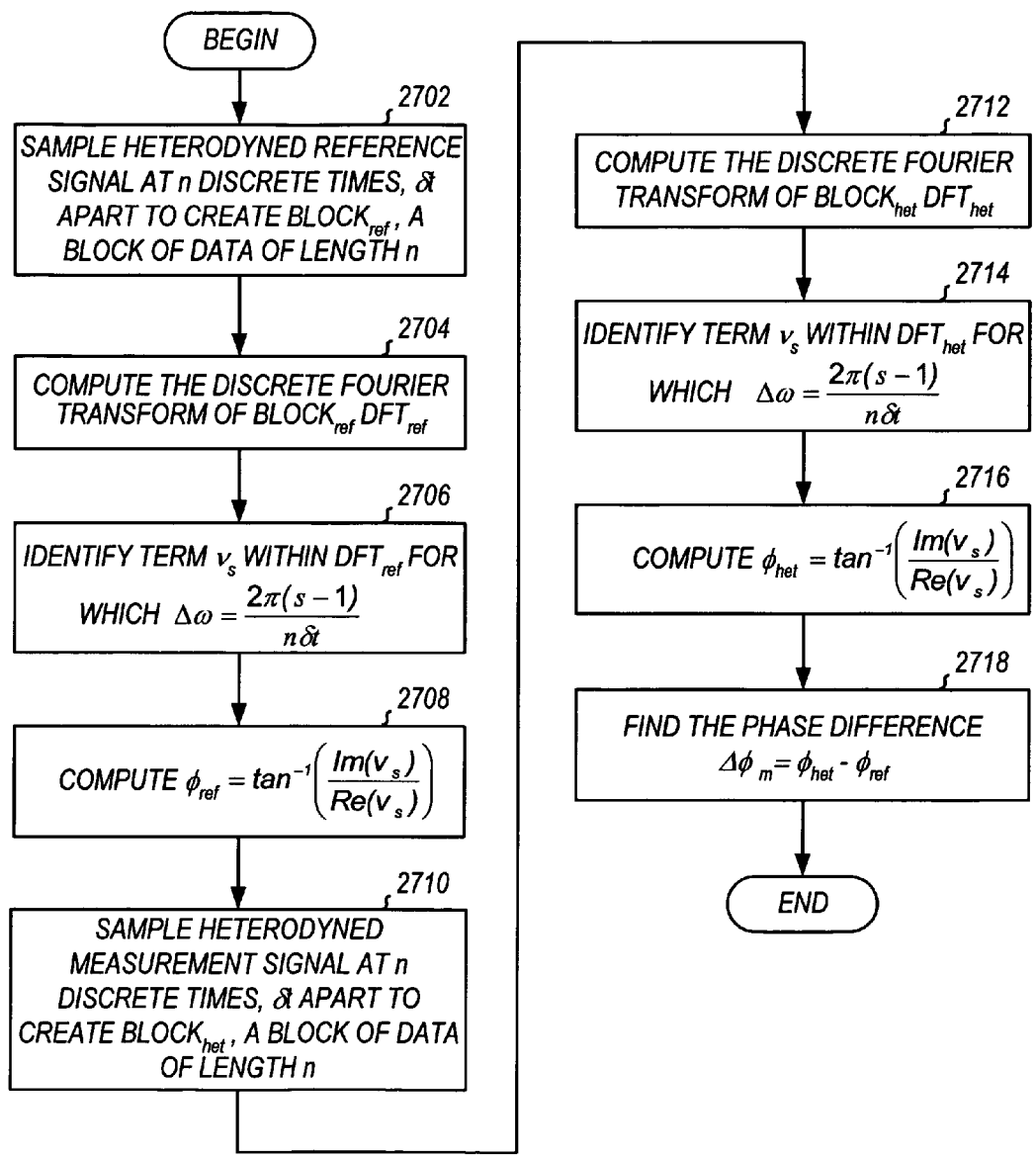
FIG. 27 is a flowchart depicting a process for determining a phase difference (e.g., $\Delta\phi_{hetm}$ and/or $\Delta\phi_{grtm}$) between two signals using a Discrete Fourier Transform (DFT) in accordance with yet another exemplary embodiment of the present invention.

With regard to still another mechanism for determining the phase difference, as depicted in FIG. 26D, the reference RF1 and the sample RF2 signals are sent to separate mixers 2612 and 2622, each with common reference frequency set by oscillator 2630. The resulting beat frequencies from mixers 2612 and 2622 are sent to time interval counter 2632. The time difference between the beat signals, resolved by counter 2632, is related to the phase difference FIG. 27 is a flowchart depicting a process for determining a phase difference (e.g., $\Delta\phi_{hetm}$ and/or $\Delta\phi_{grtm}$) between two signals may be achieved using a Discrete Fourier Transform (DFT) in accordance with yet another exemplary embodiment of the present invention. The flowchart depicts computing the phase difference in a heterodyned reference signal (steps 2702-2708) followed by computing the difference in a heterodyned measurement signal (steps 2710-2716), but as a practical matter these two computations may proceed in parallel or opposite to that depicted without departing from the spirit and scope of the present invention. Furthermore, this process is useful for determining a phase difference between any two signals, for instance from reference signal $I_{ref}$ and measurement signal $I_{het}$, and/or measurement signal $I_{het}$ and the grating signal $I_{GI}$, as performed at $\Delta\phi_{hetm}$ detector 362 and/or $\Delta\phi_{grtm}$ detector 1690.

In any case, the heterodyned signals are fed into a digitizer, which samples each signal at a small enough sampling interval, δt, that the sampling rate is in excess of twice the beat frequency, Δt (steps 2702 and 2710). The output of each digitizer is fed into a digital signal processor that accumulates respective blocks of n data samples representing a large number of oscillation periods of the signals, $Block_{ref}$ and $Block_{het}$. The data sent to the digital signal processors are of the form $u_r$; where r=1, 2, 3, ..., n. For efficient processing, n, the number of samples in the block, is optimally set to be an integral power of 2. The longer the data block, the greater will be the accuracy with which the phase can be determined.

Next, the digital signal processors compute a DFT on each block ($DFT_{het}$ and $DFT_{ref}$) (steps 2704 and 2712). The DFT output, in each case, will consist of a series of n complex numbers $v_s$, where s 1, 2, 3, ..., n.

Only the values from the first half of the series need be considered. To determine the phase shift Δφ, only the value for s which most nearly satisfies the equality $$\Delta\omega = \frac{2\pi(s-1)}{n\delta t}$$

need be identified (steps 2710 and 2714). Finally, for each block, Block$_{ref}$ and Block$_{het}$, a phase is calculated from the inverse tangent of the ratio of the imaginary components of complex numbers $v_s$ to the real components of complex numbers $v_s$, i.e., $$\phi = \tan^{-1}\left(\frac{\text{Im}(v_s)}{\text{Re}(v_s)}\right),$$

for any of the measured, reference or grating signals (steps 2708 and 2716).

With the phases known for each of the signals, the difference in any two phases can be calculated; i.e., $\Delta\phi_{hetm} = \phi_{het} - \phi_{ref}$; or $\Delta\phi_{grtm} = \phi_{GI} - \phi_{het}$. The process then ends.

The corresponding structures, materials, acts, and equivalents of all means or step plus function elements in the claims below are intended to include any structure, material, or act for performing the function in combination with other claimed elements as specifically claimed. Although the present invention has been discussed with regard to deposition and etching processes, the applications are widespread. For example, in accordance with still another exemplary embodiment, the present invention may be applied for inspecting wafer surfaces for leftover residues such as thin Cu residues in post CMP wafers. Regions with Cu will exhibit higher phase shift $\Delta\phi_m$ than Cu-free neighboring areas. Those of ordinary skill in the art will readily understand and appreciate the application of the present invention to other uses.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A heterodyne reflectometer for measuring thickness of a target layer deposed on a substrate comprising:
    an optical light source for producing a split frequency, dual polarized beam;
    a beam path diverting optical component for propagating the split frequency, dual polarized beam toward an exposed target layer deposed on a substrate at a predetermined angle of incidence;
    a first heterodyne detector for receiving the split frequency, dual polarized beam and generating a reference electrical heterodyne beat signal;
    a second heterodyne detector for receiving a reflected split frequency, dual polarized beam from the target layer and generating a measurement electrical heterodyne beat signal;
    a phase detector for receiving reference electrical heterodyne beat signal and the measurement electrical heterodyne beat signal, and detecting a phase shift between said reference and measurement electrical heterodyne beat signals; and
    a data processor for calculating a thickness relating to the target layer from the phase shift.

2. The heterodyne reflectometer recited in claim 1, wherein the split frequency, dual polarized beam further comprises:
    a first elliptical polarized beam component oscillating at a first frequency; and
    a second elliptical polarized beam component oscillating at a second frequency, the first frequency being unique from the second frequency.

3. The heterodyne reflectometer recited in claim 1, wherein the split frequency, dual polarized beam further comprises:
    a first linear polarized beam component oscillating at a first frequency; and
    a second linear polarized beam component oscillating at a second frequency, the first frequency being unique from the second frequency.

4. The heterodyne reflectometer recited in claim 1, wherein the split frequency, linearly polarized beam further comprises:
    an s-polarized beam component oscillating at the first frequency; and
    a p-polarized beam component, oscillating at the second frequency, wherein the p-polarized beam component is orthogonal to the s-polarized beam component.

5. The heterodyne reflectometer recited in claim 1, wherein the target layer is a film.

6. The heterodyne reflectometer recited in claim 1, wherein the first heterodyne detector further comprises:
    a first optical polarizing mixer optically for mixing a first polarization at a first frequency and a second polarization at a second frequency of the split frequency, dual polarized beam and generating a reference optical beat signal;
    a first optical detector coupled to the first optical polarizing for receiving the reference optical beat signal and generating the reference electrical heterodyne beat signal, and wherein the second heterodyne detector further comprises;
    a second optical polarizing mixer for mixing a reflected first polarization at the first frequency and a reflected second polarization at the second frequency of the reflected split frequency, dual polarized beam and generating a measurement optical beat signal; and
    a second optical detector coupled to the second optical polarizing for receiving the measurement optical beat signal and generating the measurement electrical heterodyne beat signal.

7. The heterodyne reflectometer recited in claim 1, further comprising:
    phase shift corrector for correcting error in the phase shift, wherein the data processor receives the corrected phase shift and calculates the thickness from the corrected phase shift.

8. The heterodyne reflectometer recited in claim 7, wherein the phase shift corrector produces a corrected phase shift by adjusting the phase shift based on a comparison of a difference between an actual phase shift for known thickness and an expected phase shift for the known thickness.

9. The heterodyne reflectometer recited in claim 1, wherein the predetermined angle of incidence is related to a refractive index for the target layer.

10. The heterodyne reflectometer recited in claim 1, wherein the predetermined angle of incidence is a predetermined default angle.

11. The heterodyne reflectometer recited in claim 1, wherein the predetermined angle of incidence approximates Brewster's angle for the target layer.

12. The heterodyne reflectometer recited in claim 1, wherein a lower extent of the predetermined angle of incidence is 0 degrees based on one of a target layer material and an interface below the target layer being isotropic for the split frequency, dual polarized beam.

13. The heterodyne reflectometer recited in claim 1 further comprises:
a grating for diffracting the reflected split frequency, dual polarized beam as a first-order beam;
a third detector for receiving the first-order beam and generating a grating signal; and
a second phase detector for receiving the grating signal and the measurement electrical heterodyne beat signal, and detecting a rating induced phase shift between said grating signal and measurement electrical heterodyne beat signal, wherein the data processor calculates the thickness from the phase shift and the grating induced phase shift.

14. The heterodyne reflectometer recited in claim 8 further comprises:
a grating for diffracting the reflected split frequency, dual polarized beam as a first-order beam;
a third detector for receiving the first-order beam and generating a grating signal;
and a second phase detector for receiving grating signal and the measurement electrical heterodyne beat signal, and detecting a grating induced phase shift between said grating signal and measurement electrical heterodyne beat signal, wherein the data processor calculates thickness from the corrected phase shift and the grating induced phase shift.

15. The heterodyne reflectometer recited in claim 14 further comprises:
a grating phase shift corrector for producing a corrected grating induced phase shift by correcting error in the grating induced phase shift, wherein the data processor calculates the thickness from the corrected grating induced phase shift and the corrected phase shift.

16. The heterodyne reflectometer recited in claim 15, wherein the data processor calculates a refractive index for the target layer from the corrected grating induced phase shift and the corrected phase shift, and calculates the thickness from the refractive index and the corrected phase shift.

17. The heterodyne reflectometer recited in claim 1 further comprising:
a second path diverting optical component for receiving the split frequency, dual polarized beam from the target layer and propagating the split frequency, dual polarized beam toward the film.

18. The heterodyne reflectometer recited in claim 1, wherein the phase detector further comprises:
a mapping function for fitting the reference electrical heterodyne beat signal and the measurement electrical heterodyne beat signal to a predetermined form.

19. The heterodyne reflectometer recited in claim 18, wherein the phase detector further comprises:
a signal conditioner for normalizing the reference electrical heterodyne beat signal and the measurement electrical heterodyne beat signal prior to fitting the electrical heterodyne beat signals to the predetermined form.

20. The heterodyne reflectometer recited in claim 1, wherein the phase detector further comprises:
a time interval counter for measuring a time between two corresponding reference points in the reference and the measurement electrical heterodyne beat signals.

21. The heterodyne reflectometer recited in claim 1, wherein the phase detector further comprises:
a frequency mixer for creating an output voltage proportional to a phase difference between the reference and the measurement electrical heterodyne beat signals.

22. The heterodyne reflectometer recited in claim 21, wherein the phase detector further comprises:
a phase shifter for setting the reference and the measurement electrical heterodyne beat signals to an initial phase.

23. The heterodyne reflectometer recited in claim 22, wherein the phase detector further comprises:
a feed back loop for feeding the output voltage to the phase shifter.

24. The heterodyne reflectometer recited in claim 1, wherein the phase detector further comprises:
an oscillator for producing a frequency signal;
a first frequency mixer for creating a first beat signal from the reference electrical heterodyne beat signal and the frequency signal;
a second frequency mixer for creating a second beat signal from the measurement electrical heterodyne beat signal and the frequency signal; and
a time interval counter for measuring a time between two corresponding reference points in the first and second beat signals.

25. The heterodyne reflectometer recited in claim 1, wherein the phase detector further comprises:
a Discrete Fourier Transform (DFT) for determining the phase shift between the reference and measurement electrical heterodyne beat signals.

26. The heterodyne reflectometer recited in claim 25, wherein the phase detector further comprises:
at least one digitizer for sampling each of the measurement and reference electrical heterodyne beat signals at a predetermined rate based on a heterodyne beat frequency for the measurement and reference signals.

27. The heterodyne reflectometer recited in claim 1, wherein the phase detector further comprises:
a cross correlation function for determining the phase shift between the reference and heterodyne electrical heterodyne beat signals.

28. The heterodyne reflectometer recited in claim 27, wherein the phase detector further comprises:
at least one digitizer for sampling each of the measurement and reference electrical heterodyne beat signals at a predetermined rate based on a heterodyne beat frequency for the measurement and reference electrical heterodyne beat signals and for determining a delay to a number of sample points in a beat cycle for the measurement and reference electrical heterodyne beat signals.

29. A heterodyne reflectometer for measuring a thickness parameter for a target layer deposed on a substrate comprising:
an optical light source for producing a split frequency, dual polarized beam, said split frequency, dual polarized beam having a first polarized beam component oscillating at a first frequency and a second polarized beam component oscillating at a second frequency, the first frequency being unique from the second frequency;

a beam path diverting optical component for propagating the split frequency, dual polarized beam toward an exposed a target layer deposited on a substrate at a predetermined angle of incidence, said target layer having a surface and a body portion;

a first detector for receiving the split frequency, dual polarized beam and generating a reference electrical heterodyne beat signal;

a second detector for receiving a reflected split frequency, dual polarized beam from the target layer and generating a measurement electrical heterodyne beat signal, said reflected split frequency, dual polarized beam being comprised of predominately one of a reflected first polarized beam component and a reflected second polarized beam component from the surface of the target layer and predominately the other of the reflected first polarized beam component and the reflected second polarized beam component from below the surface of the target layer; and a phase detector for receiving reference electrical heterodyne beat signal and the measurement electrical heterodyne beat signal, and detecting a phase shift between said reference and measurement electrical heterodyne beat signals, said phase shift being induced by a thickness of said target layer body.

30. The heterodyne reflectometer recited in claim 29, further comprises:
a data processor for calculating the thickness of said target layer body thickness from the phase shift.

31. The heterodyne reflectometer recited in claim 29, wherein the first polarization component is a first elliptical polarized beam component and the second polarization component is a second elliptical polarized beam component.

32. The heterodyne reflectometer recited in claim 29, wherein the first polarization component is a first linearly polarized beam component and the second polarization component is a second linearly polarized beam component.

33. The heterodyne reflectometer recited in claim 29, wherein the first polarization component is an s-polarized beam component and the second polarization component is a p-polarized beam component, wherein the p-polarized beam component is orthogonal to the s-polarized beam component.

34. The heterodyne reflectometer recited in claim 29, wherein the target layer is a film.

35. The heterodyne reflectometer recited in claim 29, wherein the predetermined angle of incidence is related to a refractive index for the target layer.

36. The heterodyne reflectometer recited in claim 29, wherein the predetermined angle of incidence is a predetermined default angle.

37. The heterodyne reflectometer recited in claim 36, wherein the predetermined default angle is approximately 60 degrees.

38. The heterodyne reflectometer recited in claim 29, wherein the predetermined angle of incidence approximates Brewster's angle for the target layer.

39. The heterodyne reflectometer recited in claim 29, wherein a lower extent of the predetermined angle of incidence is 0 degrees based on one of a target layer material and an interface below the target layer being isotropic for the split frequency, dual polarized beam.

40. The heterodyne reflectometer recited in claim 29, further comprising:
a first optical polarizing mixer optically coupled to the first detector for mixing a first polarization at a first frequency and a second polarization at a second frequency of the split frequency, dual polarized beam; and
a second optical polarizing mixer optically coupled to the second detector for mixing a reflected first polarization at the first frequency and a reflected second polarization at the second frequency of the reflected split frequency, dual polarized beam.

41. The heterodyne reflectometer recited in claim 29, further comprising:
phase shift corrector for correcting error in the phase shift, wherein the data processor receives the corrected phase shift and calculates a thickness from the corrected phase shift.

42. The heterodyne reflectometer recited in claim 41, wherein the phase shift corrector produces a corrected phase shift by adjusting the phase shift based on a comparison of a difference between an actual phase shift for known thickness and an expected phase shift for the known thickness.

43. The heterodyne reflectometer recited in claim 29 further comprises:
a grating for diffracting the reflected split frequency, dual polarized beam as a first-order beam;
a third detector for receiving the first-order beam and generating a grating signal; and
a second phase detector for receiving the grating signal and the measurement signal, and detecting a grating induced phase shift between said grating and measurement signals, wherein the data processor calculates the thickness from the phase shift and the grating induced phase shift.

44. The heterodyne reflectometer recited in claim 42 further comprises:
a grating for diffracting the reflected split frequency, dual polarized beam as a first-order beam;
a third detector for receiving the first-order beam and generating a grating signal;
and a second phase detector for receiving grating signal and the measurement signal, and detecting a grating induced phase shift between said grating and measurement signals, wherein the data processor calculates thickness from the corrected phase shift and the grating induced phase shift.

45. A reflectometry method for measuring a thickness parameter for a target layer deposed on a substrate comprising:
directing an optical light source for producing a split frequency, dual polarized beam toward an exposed a target layer deposited on a substrate at a predetermined angle of incidence, said split frequency, dual polarized beam having a first polarized beam component oscillating at a first frequency and a second polarized beam component oscillating at a second frequency, the first frequency being unique from the second frequency, said target layer comprising a surface and a body;
generating a reference electrical heterodyne beat signal by heterodyning the first polarized beam component oscillating at the first frequency and the second polarized beam component oscillating at the second frequency to produce a reference optical beat signal and converting the reference optical beat signal to the reference electrical heterodyne beat;
receiving a reflected split frequency, dual polarized beam from the target layer; and
generating a measurement electrical heterodyne beat signal by heterodyning a first reflected polarized beam component oscillating at the first frequency and a second reflected polarized beam component oscillating at the second frequency to produce a measurement optical beat signal and converting the measurement optical beat signal to the measurement electrical heterodyne beat; and detecting a phase shift between said reference electrical heterodyne beat signal and said measurement electrical heterodyne beat signal, said phase shift being induced by a thickness of said target layer body.

46. The reflectometry method recited in claim 45, further comprises:

calculating the thickness of said target layer body thickness from the phase shift.

47. The reflectometry method recited in claim 45, wherein the first polarization component is a first elliptical polarized beam component and the second polarization component is a second elliptical polarized beam component.

48. The reflectometry method recited in claim 45, wherein the first polarization component is a first linearly polarized beam component and the second polarization component is a second linearly polarized beam component.

49. The reflectometry method recited in claim 45, wherein the first polarization component is an s-polarized beam component and the second polarization component is a p-polarized beam component, wherein the p-polarized beam component is orthogonal to the s-polarized beam component.

50. The reflectometry method recited in claim 45, wherein the target layer is a film.

51. The reflectometry method recited in claim 45, wherein the predetermined angle of incidence is related to a refractive index for the target layer.

52. The reflectometry method recited in claim 45, wherein the predetermined angle of incidence is a predetermined default angle.

53. The reflectometry method recited in claim 52, wherein the predetermined default angle is approximately 60 degrees.

54. The reflectometry method recited in claim 45, wherein the predetermined angle of incidence approximates Brewster's angle for the target layer.

55. The reflectometry method recited in claim 45, wherein a lower extent of the predetermined angle of incidence is 0 degrees based on one of the target layer body and an interface below the surface of the target layer being isotropic for the split frequency, dual polarized beam.

56. The reflectometry method recited in claim 45, further comprising:

mixing a first polarization at the first frequency and a second polarization at the second frequency of the split frequency, dual polarized beam to produce the reference optical beat signal; and mixing a reflected first polarization at the first frequency and a reflected second polarization at the second frequency of the reflected split frequency, dual polarized beam to produce the measurement optical beat signal.

57. The reflectometry method recited in claim 45, further comprising:

correcting error in the phase shift; and calculating an error corrected thickness from the corrected phase shift.

58. The reflectometry method recited in claim 57, wherein correcting error in the phase shift further comprises:

producing a corrected phase shift by adjusting the phase shift based on a comparison of a difference between an actual phase shift for known thickness and an expected phase shift for the known thickness.

59. The reflectometry method recited in claim 45 further comprises:

diffracting the reflected split frequency, dual polarized beam as a first-order beam, said first-order beam comprises a first first-order polarized beam component and a second first-order polarized beam component;

receiving the first-order beam;

generating a grating signal by heterodyning the first first-order polarized beam component and the second first-order polarized beam component;

detecting a grating induced phase shift between said grating and measurement signals; and calculating a thickness from the phase shift and the grating induced phase shift.

60. The reflectometry method recited in claim 58 further comprises:

diffracting the reflected split frequency, dual polarized beam as a first-order beam, said first-order beam comprises a first first-order polarized beam component and a second first-order polarized beam component;

receiving the first-order beam;

generating a grating signal by heterodyning the first first-order polarized beam component and the second first-order polarized beam component;

detecting a grating induced phase shift between said grating and measurement signals; and calculating a thickness from the phase shift and the grating induced phase shift.

61. The reflectometry method recited in claim 60 further comprises:

producing a corrected grating induced phase shift by correcting error in the grating induced phase shift based on a comparison between an actual phase shift for known refractive index and an expected phase shift for the known refractive index; and calculating an error corrected thickness from the corrected grating induced phase shift and the corrected phase shift.

62. The reflectometry method recited in claim 61 further comprises:

calculating a refractive index for the target layer from the corrected grating induced phase shift and the corrected phase shift; and calculating an error corrected thickness from the refractive index and the corrected phase shift.

* * * * *